United States Patent [19]

Miller et al.

[11] 4,350,058
[45] Sep. 21, 1982

[54] TRANSMISSION CONTROL SYSTEM FOR MULTI-RATIO GEAR ARRANGEMENT

[75] Inventors: Alan L. Miller, Mt. Prospect, Ill.; John S. Ivey, Ithaca, N.Y.

[73] Assignee: Borg-Warner Corporation, Chicago, Ill.

[21] Appl. No.: 205,217

[22] Filed: Nov. 10, 1980

Related U.S. Application Data

[63] Continuation of Ser. No. 947,212, Sep. 29, 1978, abandoned.

[51] Int. Cl.$^3$ .................. B60K 41/08; B60K 41/10
[52] U.S. Cl. ........................................ 74/866; 74/856; 74/861
[58] Field of Search ............... 74/866, 856, 861, 862, 74/863; 364/426

[56] References Cited

U.S. PATENT DOCUMENTS

| 3,667,325 | 6/1972 | Ito et al. ............................ 74/866 |
| 3,684,066 | 8/1972 | Kubo et al. ...................... 74/866 X |
| 3,713,355 | 1/1973 | Wakamatsu et al. ................ 74/866 |
| 3,732,753 | 5/1973 | Olsen et al. ...................... 74/866 |
| 3,744,348 | 7/1973 | Lemon ............................ 74/869 |
| 3,759,344 | 9/1973 | Blee ............................ 74/866 X |
| 3,885,472 | 5/1975 | Wakamatsu et al. ............... 74/866 |
| 3,898,894 | 8/1975 | Aono et al. ...................... 74/866 |
| 3,938,409 | 2/1976 | Uozumi .......................... 74/856 X |
| 4,021,712 | 5/1977 | Ishihara et al. ................. 74/866 |
| 4,027,554 | 6/1977 | Ito et al. .......................... 74/866 |
| 4,031,782 | 6/1977 | Miller ............................ 74/866 |
| 4,034,627 | 7/1977 | Mizote ............................ 74/866 |
| 4,073,203 | 2/1978 | Wurst et al. ..................... 74/866 |
| 4,100,794 | 7/1978 | Meixner .......................... 73/136 A |
| 4,102,222 | 7/1978 | Miller et al. ..................... 74/866 |
| 4,107,776 | 8/1978 | Beale ............................ 74/866 X |
| 4,109,772 | 8/1978 | Poore ............................ 74/861 X |
| 4,131,036 | 12/1978 | Ivey et al. ....................... 74/866 |
| 4,140,031 | 2/1979 | Sibeud et al. ..................... 74/866 |
| 4,208,925 | 6/1980 | Miller et al. ..................... 74/866 |
| 4,208,929 | 6/1980 | Heino et al. ..................... 74/866 X |

FOREIGN PATENT DOCUMENTS 1964524 7/1970 Fed. Rep. of Germany ........ 74/861
2338122 2/1975 Fed. Rep. of Germany ........ 74/866

OTHER PUBLICATIONS

"Ratio Changing the Passenger Car Automatic Transmission", Winchell et al., Chapter 10 of the SAE Publication Design Practices—Passenger Car Automatic Transmissions.

Primary Examiner—Leslie Braun
Attorney, Agent, or Firm—James J. Jennings, Jr.

[57] ABSTRACT

The disclosed control system regulates changes of gear ratio in an automatic transmission for a vehicle. A supervisory control arrangement monitors operator input commands through the shift range selector lever, and receives a desired-ratio command either from a shift point computer or from a manual gear shift selector. When the supervisory control arrangement determines that the desired-ratio signal differs from the actual ratio, the monitoring function is interrupted and a shift-initiate command is provided. This command is utilized to assign certain components for use in a shift quality control arrangement, for effecting the controlled ratio change. A torque output signal from the vehicle drive line is used in conjunction with the shift quality control arrangement. After the shift is completed, the previously assigned components are released and the supervisory control arrangement resumes the monitoring of the desired ratio as contrasted to the actual gear ratio. One circuit controls all the upshifts, whether 1-2, 2-3, or 3-4, and one other circuit controls all the downshifts. This assignment of certain components for each controlled ratio change, and their release so they can be re-used in subsequent ratio changes, contributes to a cost-effective trade-off between the number of circuits required in the total system and the complexity of the logic circuits actually employed.

20 Claims, 15 Drawing Figures

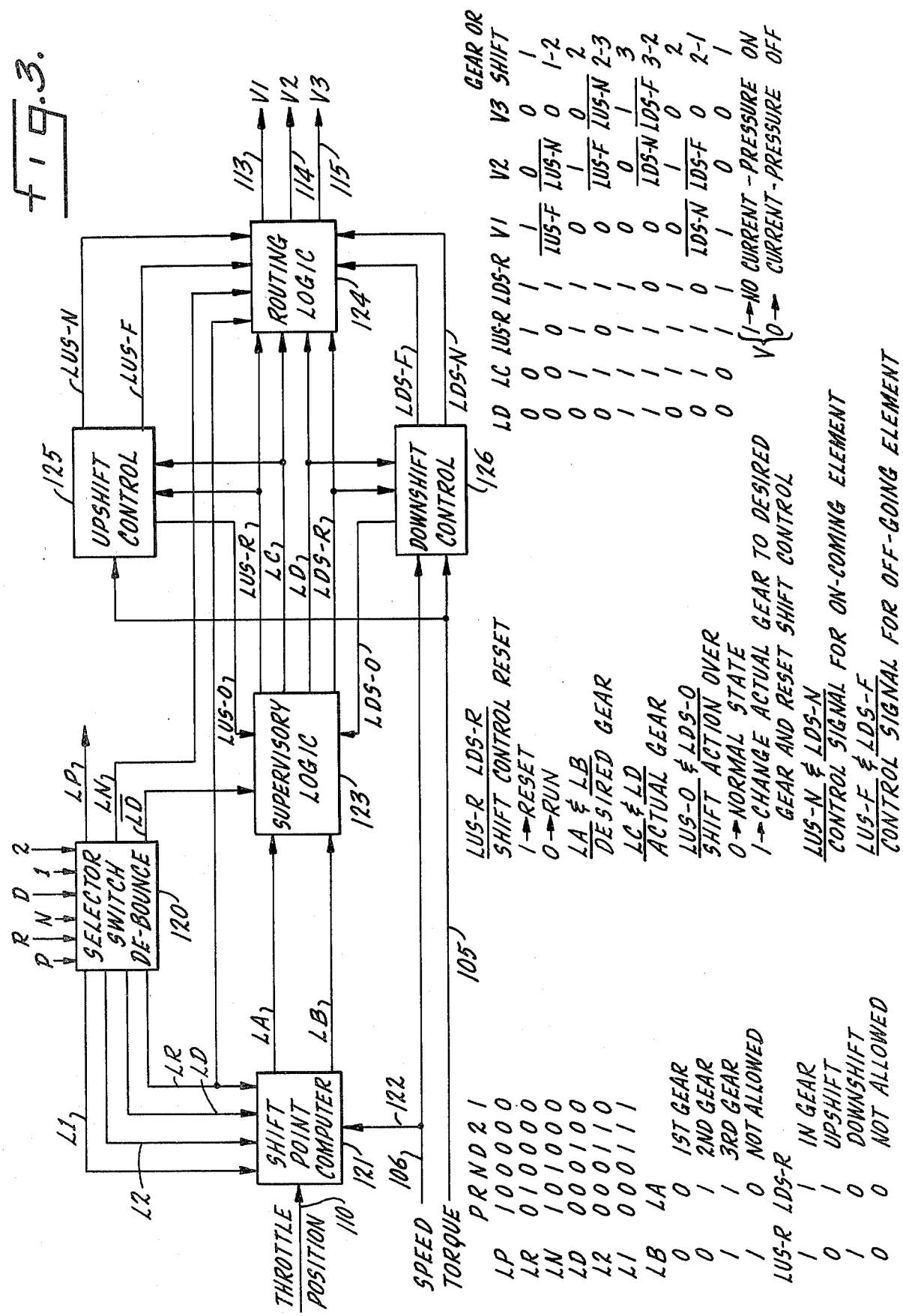

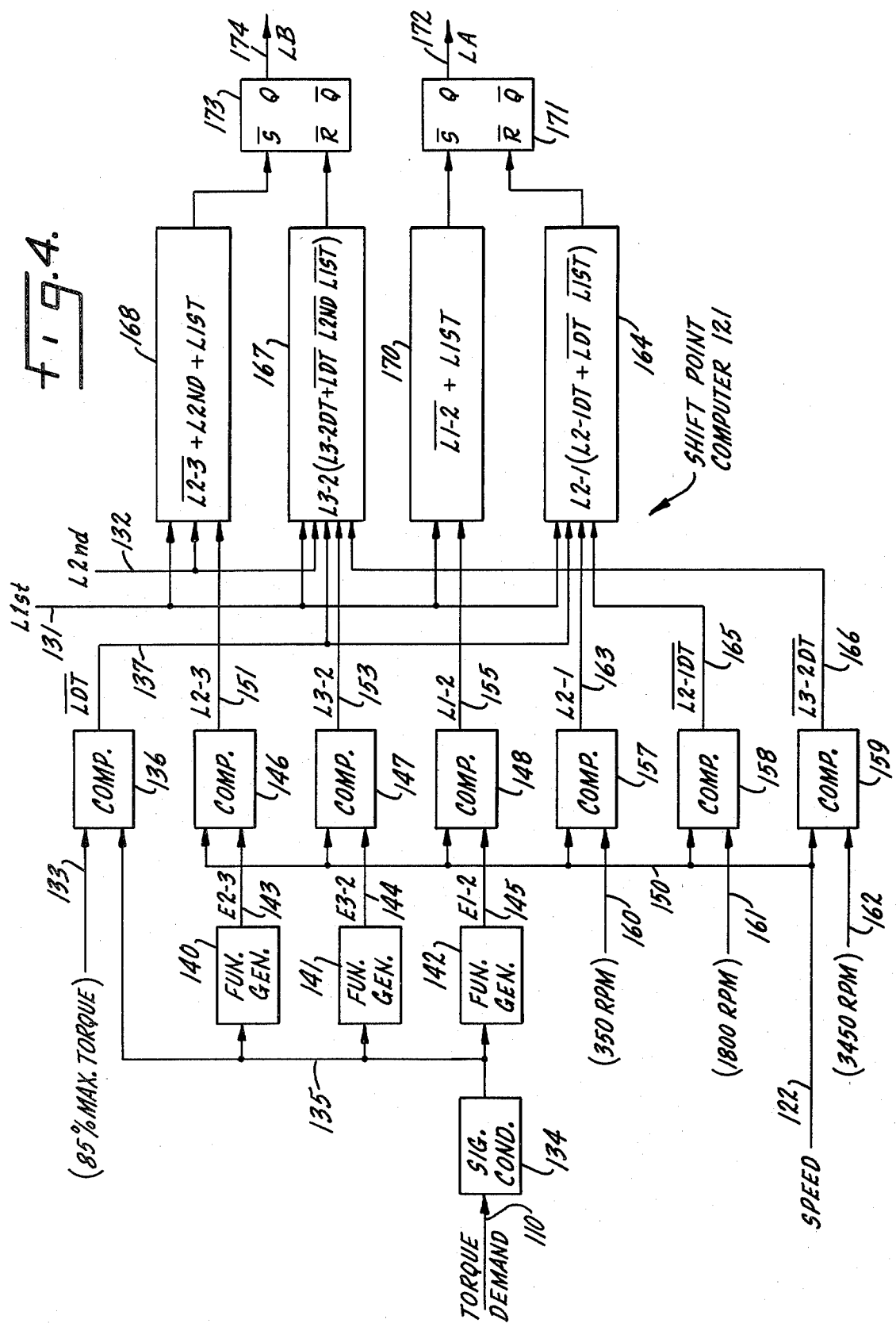

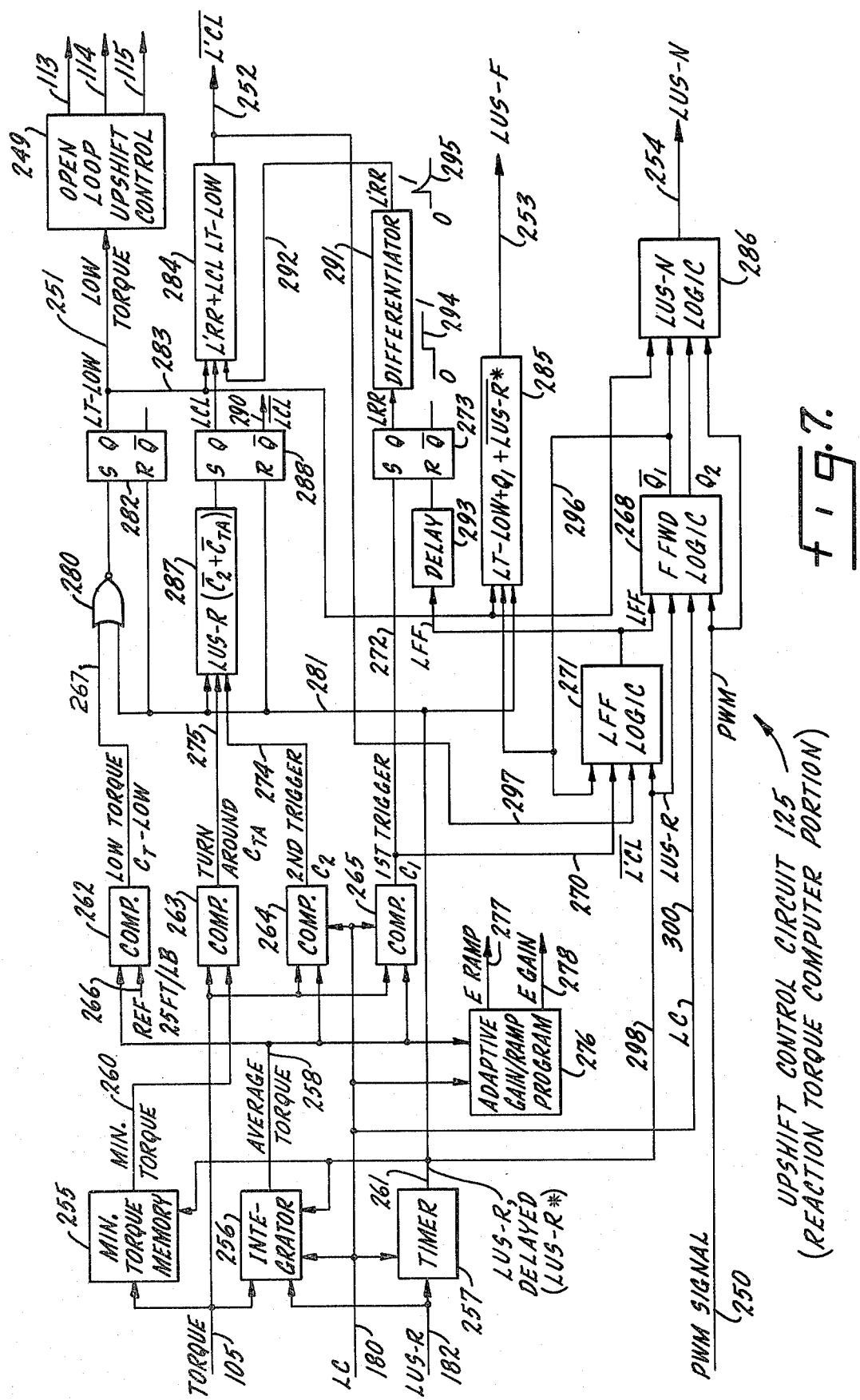

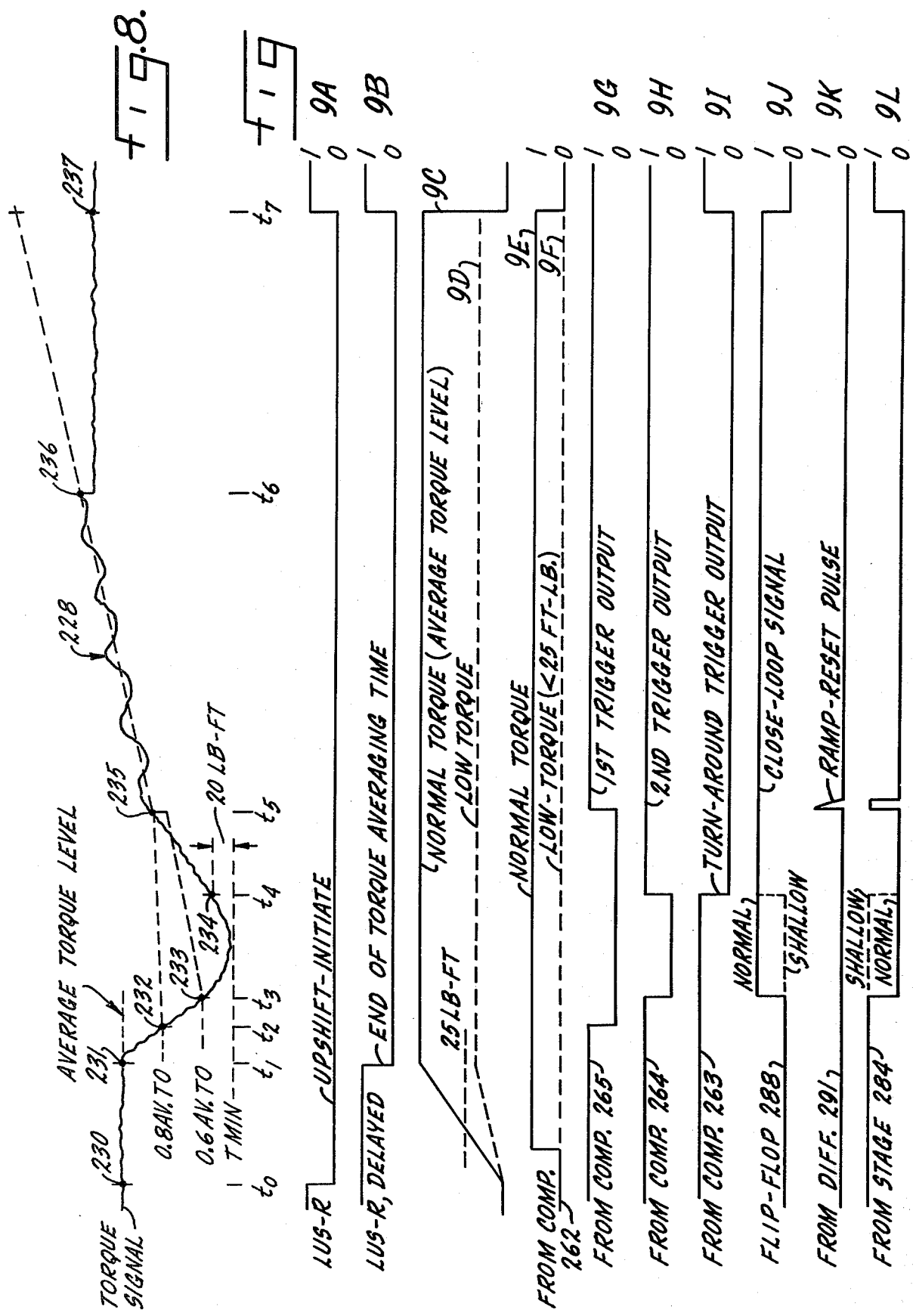

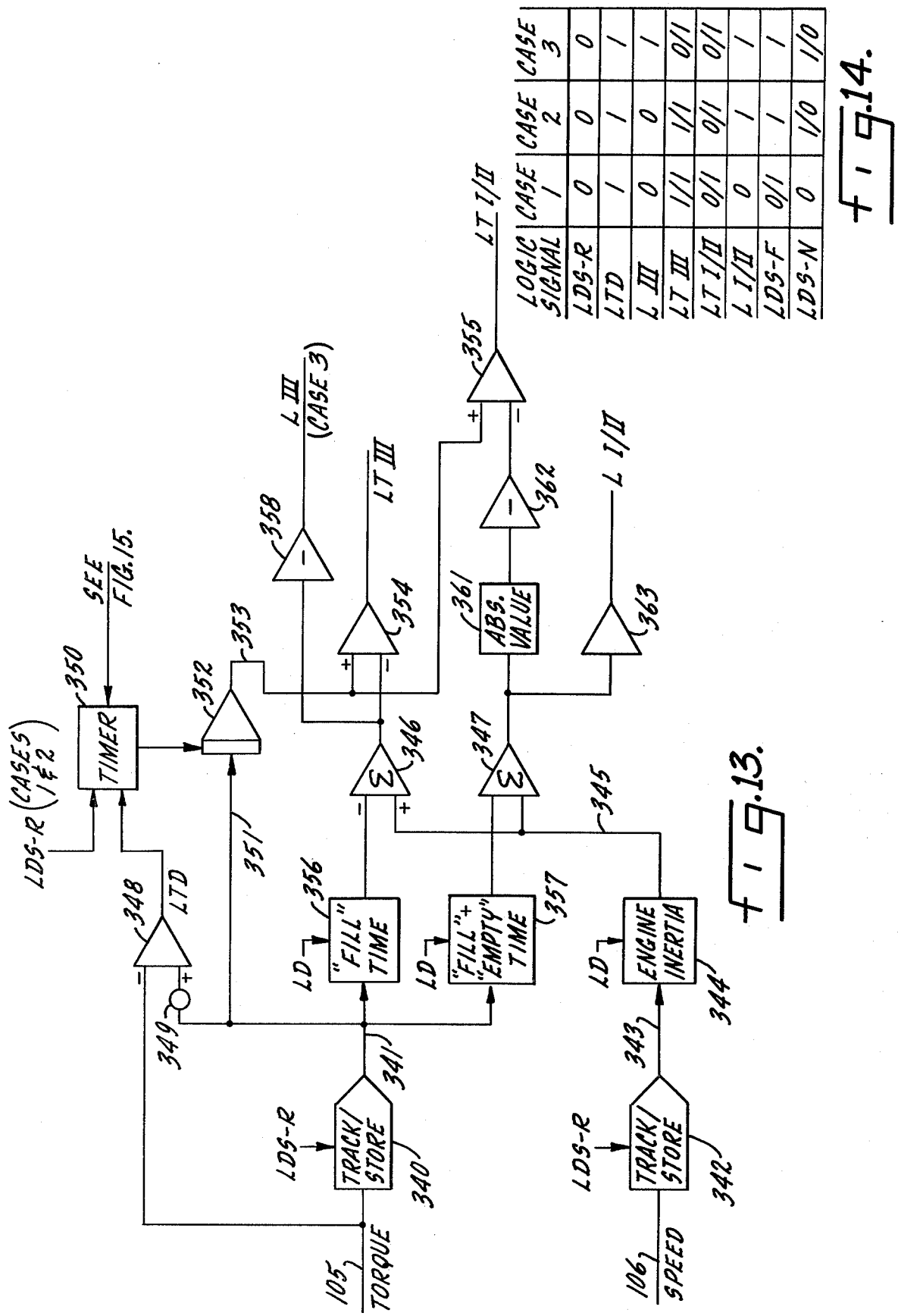

TRANSMISSION CONTROL SYSTEM FOR MULTI-RATIO GEAR ARRANGEMENT

This application is a continuation of the earlier application by the same inventors with the same title, filed Sept. 29, 1978, Ser. No. 947,212 now abandoned.

BACKGROUND OF THE INVENTION

Those skilled in the automatic transmission art have long directed considerable attention to improving the quality of a shift or change in gear ratio provided in an automatic transmission. A too brief duration shift rapidly accelerates or decelerates the vehicle, producing a noticeable jerk which is objectionable. If the shift time extends for too long a period, the friction elements of the transmission are subjected to undue wear, and in addition the shift has an unpleasant feel. In general, the optimum shift quality is realized with a shift time duration somewhere between the too-short and too-long limit conditions just described. A comprehensive treatment of this subject has been provided by F. J. Winchell and W. D. Route in "Ratio Changing the Passenger Car Automatic Transmission", which appears as Chapter 10 in the SAE publication "Design Practices—Passenger Car Automatic Transmissions", Copyright by the Society of Automotive Engineers, Inc., 1973. In particular, FIGS. 21 and 25 of this chapter depict speed, torque and pressure variations during a power-on upshift and during a power-on downshift.

Considerable research has been directed to the effective control of the shift itself, and specifically toward enhancing the shift quality by providing a closed loop system using a torque signal for regulating the change of gear ratio during the upshift. Details of the feedback system using the torque transducer and the appropriate logic signals are described and claimed in U.S. Pat. No. 4,031,728, entitled "Method and Apparatus for a Transmission Control System", which issued to Alan Leonard Miller and John Saxon Ivey on June 28, 1977, and which is assigned to the assignee of this invention. Subsequently this basic control system was improved to provide regulation of a friction-to-friction downshift, in addition to the upshift control set out in the patent noted above. This improved arrangement is described and claimed in U.S. Pat. No. 4,102,222, entitled "Transmission Control System", which issued to Alan Leonard Miller and Werner Paul Petzold on July 25, 1978, and which is assigned to the assignee of the present invention.

Additional work has been directed to ratio changing in an automatic transmission, starting from the systems set out in the two patents noted above. Of course, the straight-forward approach would be to aggregate the systems described in the patents, with an individual control arrangement for each upshift and each downshift. However this leads to the incorporation of a large number of circuits which are virtually identical, but can only be used in a particular upshift or downshift operation. Thus a considerable effort has been directed to effecting an optimum trade-off between the number of redundant circuits and the increase of logic complexity consequent upon reducing the number of circuits.

It is thus a primary object of the present invention to provide an efficient, low-cost control system for regulating the gear ratio changes in an automatic transmission, where multiple ratios must be provided and both the upshift and the downshift must be regulated.

Another important object of the invention is to provide a novel and unobvious method of operation in which the present gear ratio is compared with the desired gear ratio, and upon a disparity between the actual and the desired ratios, the comparison is interrupted while a ratio change is effected, and then the comparison is resumed.

A corollary object of the present invention is to provide such a system with the greatest simplicity and economy, by assigning circuits which are then used in regulating a gear ratio change, and thereafter releasing the assigned circuits and resuming the comparison function.

SUMMARY OF THE INVENTION

A transmission control system constructed in accordance with this invention is useful to regulate gear ratio changes in a multi-ratio automatic transmission which is coupled between an engine and a mechanical output drive connection. The system includes a shift point computer, connected to receive input information including torque demand and at least one indication of an automatic transmission output parameter, such as drive-line torque, and to provide an output signal denoting the desired gear ratio of the transmission. A supervisory control arrangement is connected to receive the output signal from the shift point computer, and to compare that output signal with a status signal denoting the actual gear ratio. When the status signal differs from the desired-gear ratio signal produced by the shift point computer, the supervisory control arrangement interrupts the comparison of signals, assigns or designates certain components for use in this ratio change, and provides controlling signals to the automatic transmission to effect the desired change of gear ratio. A shift quality control circuit is coupled to the supervisory control circuit. The shift quality control circuit provides signals to the supervisory control circuit to effect precise control of the gear ratio change, and also signals termination of the gear ratio change. This signal allows the supervisory control circuit to resume comparison of the desired gear ratio signal with the actual gear ratio signal. A transducer is positioned adjacent the output shaft of the automatic transmission, to provide the indication of the torque or other transmission output parameter to the shift quality control circuit and to the shift point computer.

Another perspective for viewing the invention is as a method for controlling gear change ratios of an automatic transmission which provides output torque over an output drive shaft. The method includes the steps of providing a first signal related to the torque demand on the transmission, and providing a second signal related to at least one parameter (such as drive-line torque) of the automatic transmission output, then operating upon the first and second signals to produce a signal denoting the desired gear ratio of the transmission. There is a comparison of the desired gear ratio signal with a signal connoting the actual gear ratio. Upon recognizing a difference between the desired gear ratio signal and the actual gear ratio signal, the comparison process is interrupted and a gear ratio change is initiated. Upon completing the gear ratio change, the comparison of the desired gear ratio signal and the actual gear ratio signal is resumed.

THE DRAWINGS

In the several figures of the drawings, like reference numerals identify like components, and in those drawings:

FIG. 3 is a block diagram depicting major subsystems of the present invention;

FIG. 4 is a block diagram, partly with Boolean notation, depicting components of one subsystem shown in FIG. 3;

FIGS. 6 and 7 are block diagrams, partly in Boolean notation, depicting certain components of other subsystems shown in FIG. 3;

FIG. 8 is a graphical illustration, and

FIGS. 9A-9L are timing diagrams related to FIG. 8, useful in understanding the present invention;

FIG. 13 is a program chart, functionally illustrating the generation of logic signals used in controlling a downshift in the present invention;

FIG. 14 is a tabulation showing the generation of the required control signals from the logic signals depicted in FIG. 13.

GENERAL BACKGROUND DESCRIPTION

Figure 1:
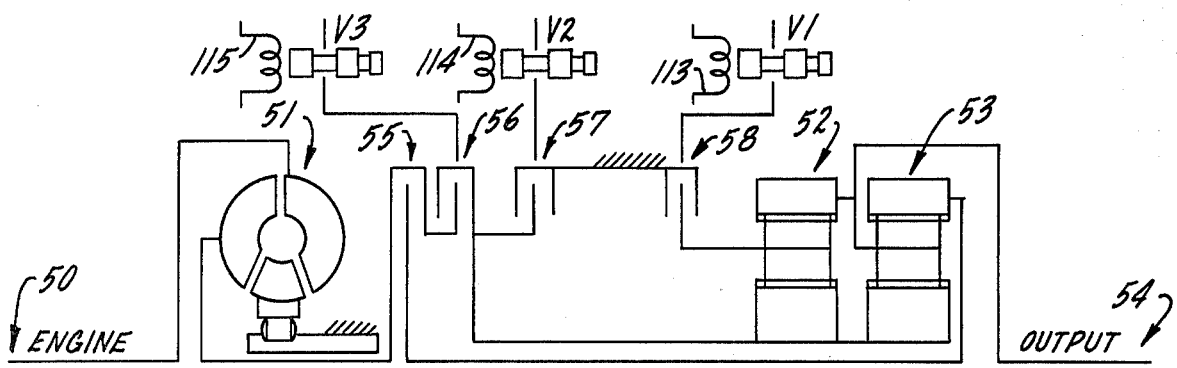
FIG. 1 is a simplified illustration of a multi-speed transmission useful with the present invention.

To assist those skilled in the art to practice the invention, a transmission mechanism will first be described in very general terms to indicate the transmission elements regulated by the control system of this invention. To this end FIG. 1 of this application is a simplified showing of the more detailed illustration of a transmission arrangement as in FIG. 1 of U.S. Pat. No. 3,744,348, which is assigned to the Assignee of this invention. In FIG. 1 of this application, the transmission generally includes an input shaft 50 connected to drive a hydraulic torque converter 51, which in turn drives through planetary gear sets 52, 53 to an output shaft 54. The transmission has a plurality of friction-engaging devices to establish the various ratios through the transmission. The friction devices are a first or front clutch 55, a second or rear clutch 56, a first brake 57, and a second brake 58.

Clutch 55 is brought on whenever the system of FIG. 1 is in drive. To establish the first drive ratio, an electrical signal is provided over line 113 to actuate valve V1, which brings on brake 58 to provide a reaction through gear set 52 to the gear set 53, and provide output drive over line 54. To establish the second drive ratio, brake 57 is brought on by providing a signal over electrical line 114 to actuate valve V2, and brake 58 is released. This provides a reaction against the ring gear in gear set 53, and thus provides the second ratio. To establish the third drive ratio, brake 57 is released and an electrical signal is passed over line 115 to operate valve V3 to bring clutch 56 on. This establishes a direct drive through the gear sets and provides the third ratio. Thus the effective changes in gear ratio can be provided by using electrical signals to control the three valves V1, V2 and V3, depicted in simplified form in FIG. 1, to regulate the actuation of brake 58, brake 57, and clutch 56, respectively. The control system of this invention, which provides the electrical signals to control the valves V1, V2 and V3, will now be described in connection with FIG. 2.

Figure 2:
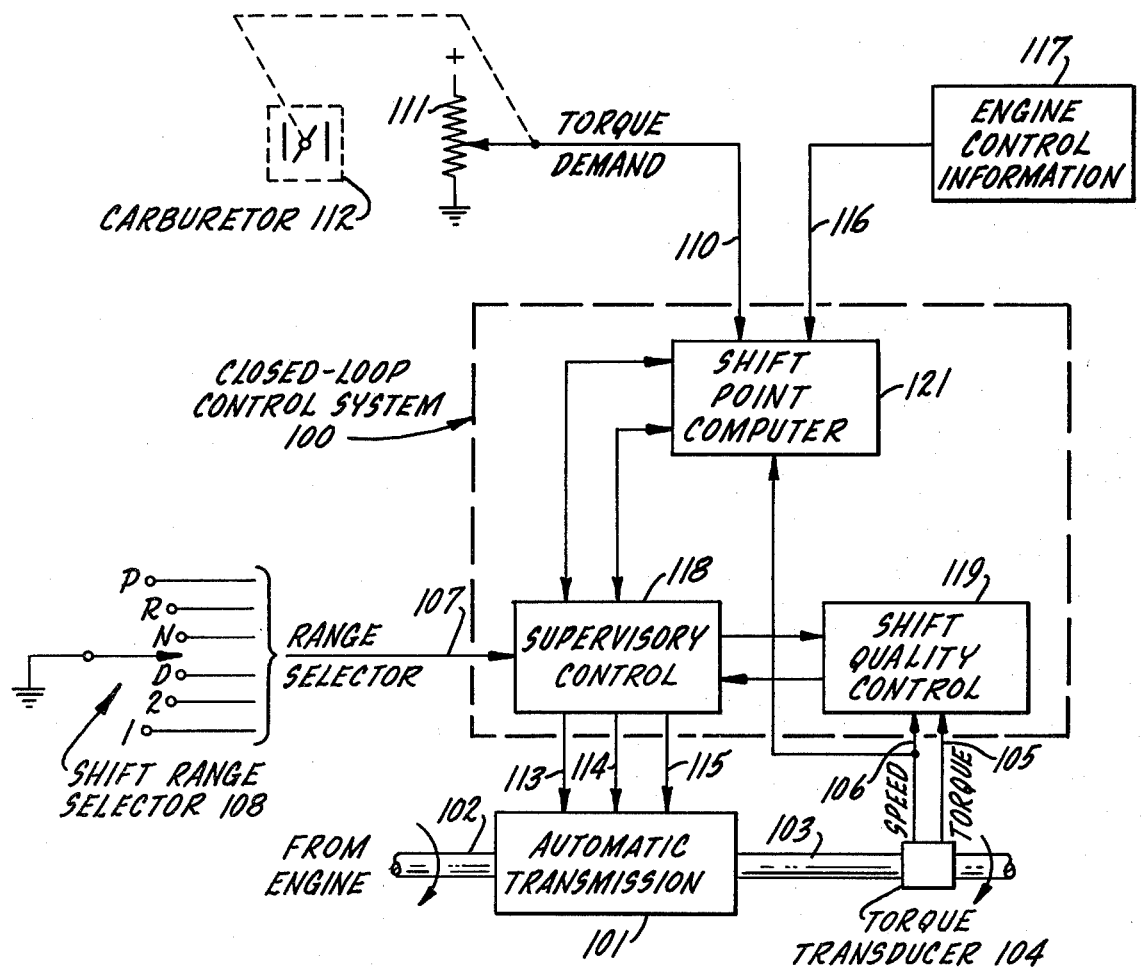
FIG. 2 is a simplified showing of the control inputs and feedback signal arrangements for regulating gear ratio changes in accordance with the invention.

FIG. 2 shows in block diagram format the use of a closed-loop control system to provide electrical signals over conductors 113, 114 and 115 to control corresponding electro-hydraulic valves (not shown) in an automatic transmission 101, to effect changes in the gear ratio of the transmission. The automatic transmission receives input drive over a shaft 102 from an engine (not shown). The output mechanical drive connection of the transmission is depicted as a drive shaft or prop shaft 103, on which a torque transducer 104 is mounted. This transducer operates to provide a torque-related signal ("drive-line torque") on line 105 and a speed-related signal on line 106. Of course where a single line is shown in the drawing, those skilled in the art will understand that frequently two electrical conductors are utilized to provide a potential difference signifying a particular parameter. One suitable transducer useful in this arrangement is described and claimed in U.S. Pat. No. 4,100,794, entitled "System for Measuring Torque and Speed of Rotating Shaft," which issued to Edwin Joseph Meixner on July 18, 1978, and which is assigned to the assignee of this invention. The control system receives other input signals, including range selector information over line 107 from a shift range selector switch 108. Such a switch or lever is generally mounted on or adjacent the steering column in a vehicle equipped with an automatic transmission, and is displaceable through the positions shown: Park, Reverse, Neutral, Drive, 2, and 1. Control system 100 also receives torque demand information over line 110, which is shown as a throttle position signal derived from a potentiometer 111. As shown the movable wiper arm of the potentiometer is mechanically linked to a movable throttle plate of a carburetor 112, but of course the potentiometer wiper arm could be positioned by displacement of the accelerator pedal, or any other suitable arrangement for providing the torque demand signal on line 110. Alternatively the torque demand signal could be derived from changes in the manifold pressure. Control system 100 also receives additional input information over line 116 from engine control information circuit 117. This additional input information can be stored information, such as a "map" or information matrix which contains information useful in obtaining maximum economy for given operating conditions. Other types of engine control information can be presented, such as a signal connoting the percentages of the various constituents in the engine exhaust, or a desired fuel-air ratio of the mixture delivered to the engine, or any other desired parameter. The control system operates with these input signals to provide on the output lines 113, 114 and 115 selective output signals for regulating selected means (such as individual valves, not shown) in the automatic transmission 101 to produce the desired change of gear ratio. The operation of such valves to regulate the on-coming and off-going friction elements in such a transmission are now well-known and understood. Hence it will only be necessary to provide an explanation of the operation of the control system to supply the requisite actuating signals on lines 113-115 for an understanding of the ratio change sequence.

As shown in FIG. 2, control system 100 includes three major subsystems; supervisory control circuit 118, shift quality control circuit 119, and shift point computer circuit 121. The shift point computer receives input information including torque demand, engine control, the speed of output shaft 103, and (through supervisory control 118) range selector information. In an over-simplified sense, supervisory control circuit 118 can be considered as monitoring input information "telling" it in which gear ratio the transmission should then be operating. Supervisory control circuit 118 "knows", from past history, the present ratio of the transmission. When the supervisory control circuit 118 determines that the actual ratio is different from the desired gear ratio, it interrupts its function of monitoring input information and initiates operation of the shift quality control circuit 119. The shift is then completed under the regulation of the shift quality control and supervisory control circuits, providing the correct actuating signals at the appropriate times over the selected ones of the conductors 113-115 to effect the gear ratio change. When the shift has been completed, this is indicated by a signal from the shift quality control circuit 119 back to the supervisory control circuit, which then returns to its previous mode of operation, monitoring the desired-ratio signal to be certain that it corresponds with the actual gear ratio of the transmission. With this perspective, a further exposition of the closed loop control system 100 will now be set out.

DETAILED DESCRIPTION OF THE INVENTION

FIG. 3 depicts major subsystems of the control system shown as a single block in FIG. 2. In addition FIG.3 illustrates a selector switch de-bounce circuit 120, which is not a major subsystem but a conventional electronic buffer circuit utilized to prevent spurious or multiple control signal outputs in response to a single, generally mechanical, input signal. For example, a driver may inadvertently jiggle the control lever in moving the shift range selector from neutral to drive, which could generate several trigger pulses. However the de-bounce circuit 120 ensures that only a single logic command signal is issued to signify the mechanical actuation of the selection lever. The de-bounce circuit, together with supervisory logic circuit 123 and routing logic circuit 124, are all represented by the single box referenced "Supervisory Control" in FIG. 2.

A shift point computer 121 is shown receiving several of the logic signals from de-bounce circuit 120 in FIG. 3. Those skilled in the art will recognize that shift point computer 121 is a specific implementation of a gear ratio command means, operative to provide a ratio change command signal, or desired-ratio signal, when it receives the appropriate input information signals. In this embodiment the shift point computer receives range selector information, represented by the four conductors for passing the logic signals L1, L2, LD and LR; torque demand information, represented by the throttle position signal received over line 110; and speed information, denoted by the signal passed over lines 106 and 122 to shift point computer 121. The output of shift point computer 121 is a ratio-change command signal, represented by the two logic signals LA and LB. The individual conductors for translating the logic signals are not identified in FIG. 3, as it would add to the legend density without imparting additional information. The logic signals LA and LB denote the desired-ratio information, and together LA and LB are considered a ratio-change command signal.

Another important subsystem is supervisory logic circuit 123, connected as shown to receive various input signals, including the ratio-change command signal (LA and LB), and range selector information ($\overline{LD}$). The bar () over a signal notation, as in $\overline{LD}$, indicates the logical inverse of the signal ("not LD"). The output of the supervisory logic circuit includes shift-initiate signals and actual gear ratio (or status) signals. The shift-initiate signals are represented by the two logic signals LUS-R and LDS-R. The "R" generally signifies a "reset" or "initiate" action, to initiate a cycle of gear-ratio-change operation including other subsystems such as routing logic circuit 124, and either upshift control circuit 125 or downshift control circuit 126. The upshift-initiate signal LUS-R is applied to both the upshift control circuit 125 and the routing logic circuit 124, and the downshift-initiate signal LDS-R is applied both to the downshift control circuit 126 and to routing logic circuit 124. The status signals LC and LD denoting the actual gear positions are both applied to the routing logic circuit 124, with the status signal LC also being passed to upshift control circuit 125, and the status signal LD also being applied to the downshift control signal 126.

Upshift control circuit 125 receives the status signal LC, the drive-line torque signal over line 105, and upon receipt of the upshift-initiate signal LUS-R, provides two regulating signals to the routing logic circuit 124. These regulating signals are LUS-N, to control the on-coming friction element, and LUS-F, to control the off-going friction element. These two signals will be directed through the routing logic circuit 124 to provide the appropriate signals over two of the three conductors 113, 114 and 115 to regulate the shift. Routing logic circuit 124 also receives both status signals LC and LD, and whichever of the shift-initiate signals (LUS-R or LDS-R) is issued by supervisory logic circuit 123. In a similar manner downshift control circuit 126 receives the status signals and the torque signals, and operates to provide the two signals LDS-F and LDS-N to the routing logic circuit for providing signals over two of the three conductors 113-115 to regulate the off-going and on-coming elements during a downshift.

At the end of a gear ratio-change sequence a "shift-completed" signal is returned from the upshift or downshift control circuit to the supervisory logic circuit 123. That is, the upshift control circuit provides a termination signal LUS-O to the supervisory logic circuit 123 at the end of an upshift sequence, and the downshift control circuit 126 provides a shift-completed signal LDS-O to supervisory logic circuit 123 at the end of a downshift gear ratio change sequence.

The preceding brief description of FIG. 3 includes many simplifications of the complete operating system. By way of example, each of the upshift and downshift control circuits comprises both closed loop computation circuitry and a reaction torque computation circuit, analogous to the closed loop controller 47 and reaction torque computation circuit 60 shown in FIG. 5 of U.S. Pat. No. 4,031,782. However these simplifications add an understanding of the overall system operation and will be helpful as the individual subsystems are successively described.

Major components of the shift point computer subsystem 121 are depicted in FIG. 4. As there shown the torque demand signal is provided on input conductor 110, and the speed-indicating signal is applied over input conductor 122. There is a first logic signal L1st applied over conductor 131 when the transmission is in first gear, and a second logic signal L2nd applied over conductor 132 when the transmission is in the second drive ratio. The other input signals are reference voltage level signals, each connoting a specific torque demand or speed value. For example, on line 133 is a voltage level signal connoting 85% of the maximum torque demand which can be indicated by the throttle position signal on line 110. This demand signal is conditioned (filtered) in stage 134 to provide on line 135 a conditioned torque demand signal. Thus the output of comparator 136 provides on line 137 a logical signal indicating whether the torque demand exceeds 85% of the maximum available torque. This is frequently termed a "detent" or "kickdown" signal obtained when the accelerator is floored by the driver to produce a rapid acceleration.

Figure 5:
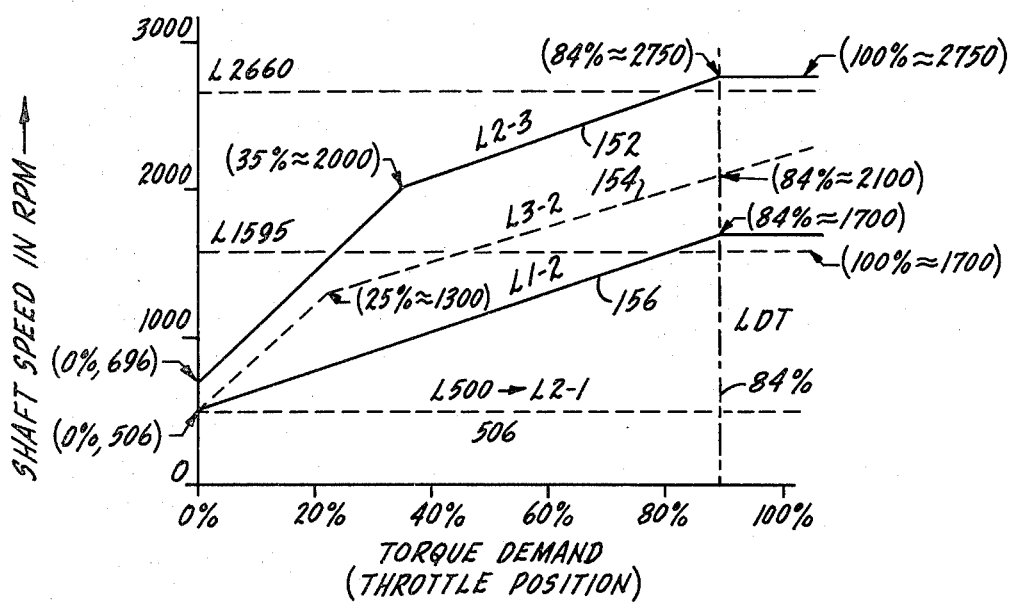
FIG. 5 is a graphical illustration useful in understanding the operation of the systems shown in FIGS. 3 and 4.

Each of the three function generators 140, 141, and 142 also receive the torque demand signal on line 135 and provide an analogue output on the respective conductors 143, 144 and 145. The signals on conductors 143–145 are all analogue signals. These functional signals are compared, in the comparators 146, 147 and 148, with the speed-indicating signal received over lines 122, 150. The digital outputs of the comparators 146–148 are represented in FIG. 5. FIG. 5 shows that comparator 146 provides on line 151 a functional such as that depicted by the curve 152 in FIG. 5. The output of comparator 147 passed over line 153 is represented by the dashed-line curve 154 in FIG. 5. The functional output of comparator 148 passed over line 155 is depicted by the curve 156 in FIG. 5. The legends on FIG. 5 generally indicate the shaft speed in revolutions per minute (rpm) along the ordinate, and the throttle position along the abscissa. Those skilled in the art will understand some other indication of torque demand, such as manifold pressure, could be selected and displayed along the abscissa without modifying the functional curves depicted in FIG. 5.

There are three additional comparators 157, 158 and 159 shown in FIG. 4, and each receives as one input signal the speed-denoting signal on line 150. In addition comparator 157 receives over line 160 a voltage level signal which connotes a speed of 350 rpm; comparator 158 receives a voltage level signal signifying 1,800 rpm over line 161; and comparator 159 at its input line 162 receives a voltage level signal connoting a shaft speed of 3,450 rpm. The output signal of comparator 157 is passed over line 163 to one input connection of processing stage 164, and the output of comparator 158 is passed over line 165 to the same processing stage. The output of comparator 159 is passed over line 166 to one input connection of processing stage 167, which stage also receives the first gear and second gear signals over lines 131, 132, the output signal from kickdown comparator 136, and the output signal from comparator 147. Processing stage 168 receives the L1st and L2nd logic signals, and also receives the output signal from comparator 146. The processing stage 170 receives the logic signal related to the first gear on conductor 131, and also receives the output signal from comparator 148. The respective outputs from processing stages 164 and 170 are coupled to the $\overline{R}$ and $\overline{S}$ connections of a flip-flop 171, which at its output conductor 172 provides the LA digital signal shown as one output of shift point computer 121 in FIG. 3. The outputs of the other two processing stages 167, 168 are respectively connected to the $\overline{R}$ and $\overline{S}$ input connections of the other flip-flop 173 which at the output conductor 174 provides the LB signal from the shift point computer. While certain mathematical operations are indicated within each of the processing stages 164, 167, 168 and 170, those skilled in the art will appreciate that various circuit configurations can be implemented to achieve the mathematical processes symbolized by the notation within these stages. The term "processing stage" refers to a logic circuit for accomplishing the mathematical operation(s) set out in Boolean notation within the rectangle identified as a particular stage.

Figure 6:
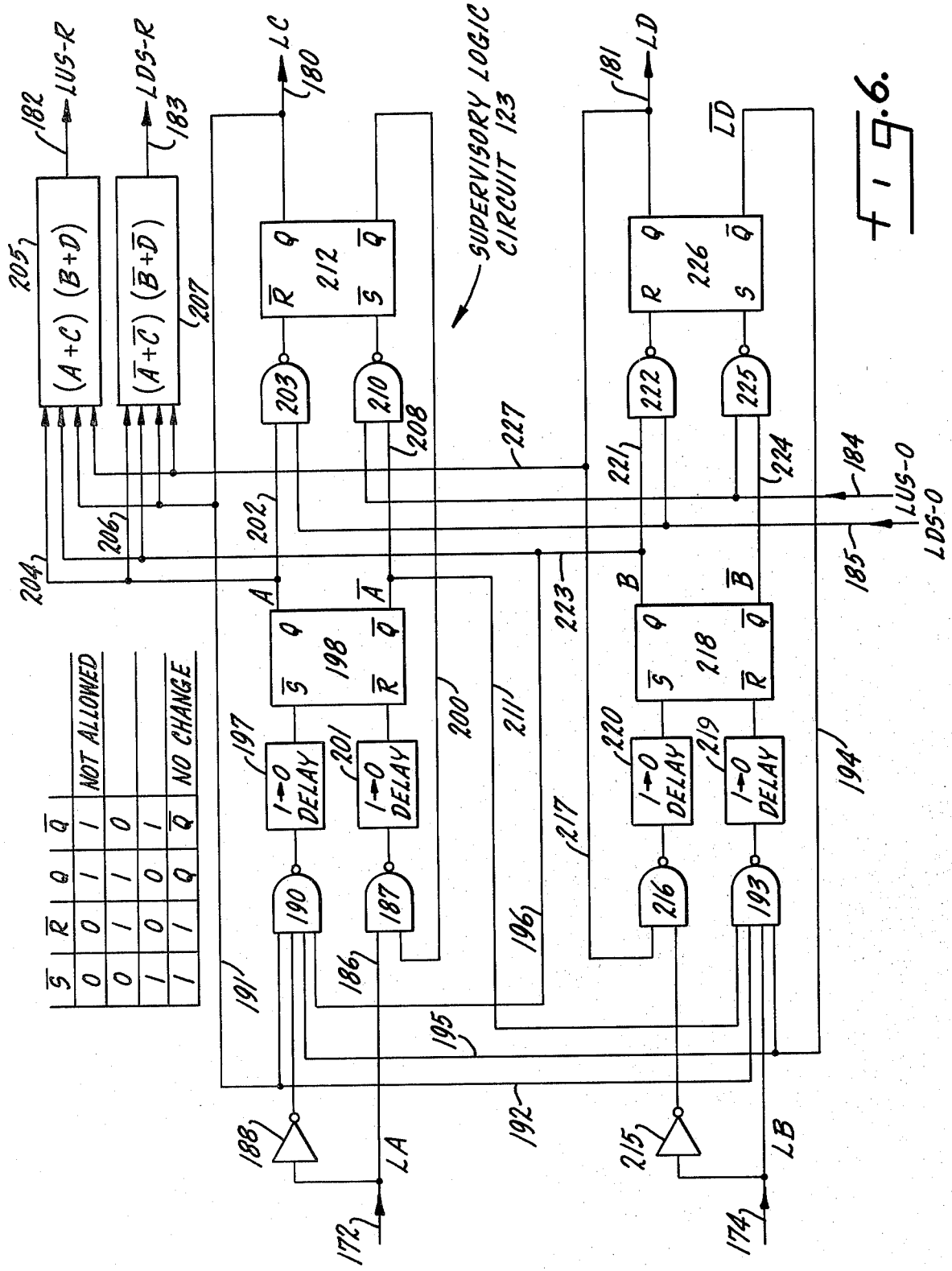

FIG. 6 depicts the supervisory logic sub-system 123, shown more generally in FIG. 3. As shown in FIG. 6, the LA and LB signals are received over conductors 172, 174 to indicate the desired gear ratio. Output signals LC and LD are provided on conductors 180, 181, and these signals indicate the actual gear ratio of the system. In addition the system of FIG. 6 provides the shift-initiate signals over either of conductors 182 or 183 to commence an upshift or a downshift operation, and receives a signal LUS-O or LDS-O back over conductor 184 or 185 when the particular shift operation is completed.

In more detail, the ratio-change command signal or desired-gear signal is applied as the two digital signals LA, LB over the conductors 172, 174 at the input side of the supervisory logic control arrangement as shown in FIG. 6. The signal LA on conductor 172 is applied directly over conductor 186 to one input section of a NAND gate 187 and the same signal is applied through an inverter stage 188 to one input connection of another NAND stage 190. This NAND gate 190 also receives a feedback signal over line 191, which is also passed over line 192 to another NAND gate 193, and NAND gate 190 receives another feedback signal over lines 194, 195. Still another feedback signal is provided over line 196 to the last input connection of NAND gate 190. The output signal of this NAND gate is passed through a delay stage 197, which is of the type that delays only the negative-going transition of a pulse, and passes the leading edge or positive-going edge of a pulse with virtually no delay. In turn this delay signal from stage 197 is passed to the $\overline{S}$ input of flip-flop 198, as indicated. NAND gate 187 receives a feedback signal over line 200, and passes its output signal through another delay stage 201, which similarly effects a delay only on the negative-going transition of a pulse signal to the $\overline{R}$ input of flip-flop 198. The output signals at Q and $\overline{Q}$ of flip-flop 198 are designated A and $\overline{A}$, respectively, the better to delineate the processing operations in the subsequent stages of the supervisory logic control sub-systems.

The logical A signal is applied from the Q output of flip-flop 198 over conductor 202 to one input of NAND gate 203, and the logical A is also applied over conductor 204 to one input connection of processing stage 205, as well as over conductor 206 to one input connection of the other processing stage 207. These processing stages are those that eventually provide the respective shift-initiate signals LUS-R over conductor 182 or LDS-R over conductor 183. The $\overline{A}$ logical output signal from flip-flop 198 is applied over conductor 208 to one input connection of NAND gate 210, and the $\overline{A}$ signal is also applied over conductor 211 to one input connection of the NAND stage 193. NAND gate 203, in addition to receiving the logical A signal on line 202, also receives the downshift-over or LDS-O signal over line 185. The output of NAND gate 203 is coupled to the $\overline{R}$ input of flip-flop 212, of which the Q output is coupled to output conductor 180 to provide the LC signal (already described in connection with FIG. 3). The Q output also provides a feedback signal over line 191 to NAND gate 190 and to NAND gate 193, and this feedback signal is also applied to both of the processing stages 205 and 207. NAND gate 210 in addition to receiving the $\overline{A}$ logical signal over line 208 also receives the upshift over signal over input conductor 184, and the output signal from NAND gate 210 is applied to the $\overline{S}$ input of flip-flop 212. The $\overline{Q}$ output of flip-flop 212 is coupled back over conductor 200 to one input connection of NAND gate 187. Thus the output signals provided by flip-flop 212 are the LC and the $\overline{LC}$ signals as indicated.

In the lower portion of FIG. 6, the LB signal on line 174 is passed directly to one input connection of NAND gate 193, and is also passed through an inverter stage 215 to one input connection of another NAND stage 216, the other input connection of which receives the LD output signal on line 181 as a feedback signal over line 217. The other inputs to NAND gate 193 are the $\overline{LD}$ signal over line 194, the LC signal sent back over lines 191, 192, and the $\overline{A}$ signal on line 211. The output from NAND gate 193 is applied through a delay stage 219 which delays only the negative-going portion of the pulse, and this signal is applied to the $\overline{R}$ input of a flip-flop 218. The output signal from NAND gate 216 is similarly passed through another delay stage 220, which also operates only upon the negative-going transition of the pulse and provides this delayed signal to the $\overline{S}$ input of flip-flop 218. At its Q output flip-flop 218 provides a logical B signal which is passed over line 221 to NAND gate 222, and is also passed over line 223 to one input connection of processing stage 205 and similarly to an input connection of processing stage 207. The same logical signal on line 223 is also passed over line 196 to one input connection of NAND gate 190. The $\overline{B}$ signal from flip-flop 218, appearing at its $\overline{Q}$ output connection, is passed over line 224 to one input connection of NAND gate 225, which also receives an input connection from line 184. The output of NAND gate 225 is applied to the S input connection of flip-flop 226, which also receives the output of NAND gate 222 at its R input connection. The Q output of flip-flop 226 is used to provide the LD signal on conductor 181 which is also fed back over line 217 to an input connection of NAND gate 216, and over line 227 to each of the processing stages 205, 207. The $\overline{Q}$ output of flip-flop 226 provides an $\overline{LD}$ signal, which is passed as a feedback signal over line 194 to one input connection of NAND gate 193, and over line 195 to one input connection of NAND gate 190. The circuit depicted in FIG. 6 thus receives the desired-ratio input signal LA, LB on the input conductors 172, 174, and the shift-completed signal (LUS-O or LDS-O) over either conductor 184 or 185, and provides the actual gear ratio or status signal LC, LD on the output conductors 180, 181, as well as the shift-initiate signal LUS-R or LDS-R over conductor 182 or 183. The tabulation in the upper left hand corner of the figure depicts the outputs at Q and $\overline{Q}$ of each of the flip-flops 198, 212, 218 and 226 for a given set of logical input signals at the $\overline{S}$ and $\overline{R}$ inputs.

FIG. 7 depicts major components in the upshift control circuit 125, and more particularly the reaction torque computer portion of this sub-system. The better to understand the interconnection and cooperation of the components shown in FIG. 7, reference will be made during the physical description and thereafter in the operating description to FIG. 8, in which curve 228 represents variations in the torque signal on line 105 in FIG. 7 during an entire upshift sequence. In addition the timing diagrams 9A–9L depicted below the torque curve 230 in FIG. 8 will be utilized to assist those skilled in the art to understand and implement the control system of this invention. The timing diagrams generally refer to different times t0 through t7 shown along the abscissa just below the torque curve 228, and in turn these times are correlated with the marks 230–237 shown at different points of the torque curve 228.

In FIG. 7 there are four input signals shown, three of which have already been described. That is, the torque signal is provided on input line 105; the LC signal (a part of the status signal or shifting signal comprised by both LC and LD) is applied over line 180; and the upshift-initiate signal LUS-R is applied over input conductor 182. The PWM signals shown applied over input line 250 will be described in connection with FIG. 10. For the present it is sufficient to note that this pulse width modulation signal is one alternating at a 50% duty cycle when the system is staying in the same gear ratio, and of which the duty cycle is altered during either an upshift or a downshift. There are also four output signals shown in FIG. 7. On output line 251 a low torque signal is provided to actuate an open loop upshift control circuit 249 whenever the shift cycle is initiated (denoted by a signal received over input line 182) at a time when the torque signal on line 105 is at a level which signifies the torque value below some nominal level (for example, 25 foot-pounds). Under these conditions the low torque signal on line 251 initiates operation of the control circuit 249, to perform the shift sequence in a timed arrangement in the same manner that an uncontrolled shift is normally produced. This avoids use of the closed-loop control system when the torque level is too low for stable, effective operation.

On output line 252 is another logic signal denoted $\overline{L'CL}$. This is the ramp-reset control issued at time t5 shown in FIG. 8, to reset the "ramp" or slope of the reference signal which forms the basis for that portion of the torque curve between times t5 and t6 in FIG. 8. On lines 253 and 254 are the regulating signals for the off-going and on-coming members in the controlled gear set. With this perspective, a more detailed description of the block arrangement of FIG. 7 will now be set out.

The torque signal received over line 105 is applied to a minimum torque memory circuit 255, to an integrator circuit 256, and to a timer circuit 257. The integrator circuit 256 also receives the upshift-initiate signal LUS-R, and a timing signal from timer 257. Thus, over a time corresponding to that between t0 and t1 in FIG. 8, the integrator circuit operates to provide the average torque level signal on line 258 after time t1 and thereafter throughout the shift sequence. The memory circuit 255 is of the type which is continually reset as the level of the input signal decreases, and which stores (or "remembers") the minimum level of the input signal even after it begins to increase. This minimum-torque-level signal is presented on line 260. Timer 257 is preset to provide a control signal to regulate integrator 256 during the interval between t0 and t1 in FIG. 8, and upon the expiration of this time interval, to provide a delayed upshift-initiate signal on its output line 261.

There are four comparator circuits 262-265 connected as shown to operate upon the just-described signals, and to provide a variety of trigger and regulating signals. More specifically, comparator 262 receives the average torque signal over line 258, and also receives a reference voltage signal on line 266, which reference voltage corresponds to a preset minimum torque level. In a preferred embodiment this level was set to correspond to 25 foot-pounds. Thus comparator 262 operates to provide on output line 267 a logic signal indicating whether there is an adequate torque level on the driveline to complete a closed-loop, controlled shift sequence. The low torque signal on line 251 is provided at the termination of the torque-averaging interval between times t0 and t1 shown in FIG. 8, whenever the average torque value is not at or above the preset reference level such as 25 foot-pounds.

First comparator 265 is, in effect, only used during a 1-2 upshift. This circuit is provided to "tell" the feed-forward circuit to prepare the control valve for the quick response required during the 1-2 upshift. To this end the first comparator 265 passes a first trigger signal, shown as C1, over line 270 to another processing stage 271, and the first trigger signal is also passed over line 272 to the S input of a flip-flop 273. The closed-loop operation of the entire system will be actuated either by a second trigger signal from second comparator circuit 264, provided over its output conductor 274, or by a turn-around trigger signal provided from comparator circuit 263 over its output conductor 275. The comparator 265 provides its first trigger signal on line 272, and on line 270, at approximately the time when the value of the torque signal falls to 0.8 times the average torque level, indicated as time t2 in FIG. 8. The second comparator circuit 264 is set to issue the second trigger signal over line 274 when the average torque level falls still further, to 0.6 times the average torque level, depicted at time t3 in FIG. 8. The turn-around comparator 263 provides a signal on line 275 after the average torque level signal has reached its minimum level, and increased to a point (denoted 234 in FIG. 8) at which the average torque signal is 20 foot-pounds greater than the minimum value signal. This occurs at time t4 in FIG. 8.

The adaptive gain/ramp program stage 276 receives both the average torque signal on line 258 (see FIG. 9C), and the LC status signal over line 180. This program stage 276 operates to provide a first analogue voltage on line 277, to regulate the ramp voltage in the closed-loop controller in FIG. 10 during the controlled shift, and a second analogue voltage over line 278 to correspondingly regulate the gain in the closed loop. These connections will be described later, but their basic function will be understood from reference to FIG. 6 of U.S. Pat. No. 4,031,782. In that figure the adaptive computation circuit 93 provides a ramp control analogue voltage over conductor 92 and a gain control analogue voltage over conductor 94. It is noted that the adaptive computer 93 also provides a feed-forward signal, and that will become apparent in the present application also.

Considering again the upshift control circuit 125 depicted in FIG. 7 of this application, the low torque signal on line 267 is passed to one input connection of a NOR gate 280, which also receives the delayed shift-initiate signal on line 261 and the common line 281. The output of NOR gate 280 is applied to the S input of a flip-flop 282, which at its R input receives the delayed shift-initiate signal on common line 281. The output signal from the Q output of flip-flop 282 is the low torque signal on line 251, and this signal is also passed over line 283 to the processing stages 284, 285 and 286.

Processing stage 287 receives the delayed shift-initiate signal (FIG. 9B), the turn-around signal (FIG. 9I) over line 275, and the second trigger signal (FIG. 9H) over line 274. The output of processing stage 287 is applied to the S input of a flip-flop 288, which at its R input receives the delayed upshift signal on line 281. Flip-flop 288 at its $\overline{Q}$ output provides the $\overline{LCL}$ logic signal to processing stage 284, and at its Q output provides a LCL output on conductor 290, for use in the closed-loop controller portion depicted in FIG. 10. The LCL signal from flip-flop 288 is passed as one input signal to processing stage 284, which also receives the low torque signal over line 283 and a feedback signal from differentiator circuit 291 over conductor 292. Processing stage 284 provides the $\overline{L'CL}$ signal on output conductor 252, and this signal is represented in FIG. 9L.

As noted previously, the first trigger signal on line 272, also depicted in FIG. 9G, is passed to the S input of flip-flop 273. At its R input this flip-flop receives a delayed signal from the delay stage 293, and at its Q output flip-flop 273 provides an LRR signal (that is, a logic signal to control ramp reset at time t5) to the differentiator stage 291. This input signal is that generally shown by the step-function signal 294 beneath the differentiator, and the action of differentiator stage 291 is to provide a sharp pulse such as that illustrated as 295, and shown in FIG. 9K, to control reset of the ramp.

Processing stage 285, in addition to receiving the delayed upshift-initiate signal on line 281, also receives the low torque signal over line 283 from flip-flop 282, and receives a feedback signal over line 296 from processing stage 268. At its output side processing stage 285 provides the regulating signal for the off-going friction element, designated LUS-F, on line 253.

Processing stage 271 receives a feedback signal from stage 286 over line 296, the trigger signal developed by the first comparator 265 over line 270, the closed-loop trigger signal (FIG. 9L) over line 297 from the processing stage 284, and the delayed shift-initiate signal (FIG. 9B) on line 298. This delayed signal is also passed directly to the processing stage 286, as indicated. The output signal from processing stage 271 is passed both to the next processing stage 268, and to the delay stage 293. In addition to the just-described input signals to processing stage 268, the LC status signal is also applied over line 300 to this stage, and the PWM signal is passed over line 250 to stage 268, and to the last processing stage 286. The PWM signal is derived from the closed-loop control arrangement depicted in FIG. 10, as will be described. In FIG. 7 the two outputs from the processing stage 268 are both passed directly to the last processing stage 286 as shown, and in addition the $\overline{Q1}$ is passed as a feedback signal over line 296 to one input connection of stage 271. The low torque signal provided by the flip-flop 282 is passed over line 283 as one input signal to processing stage 286, and the other input signals to this stage have already been described. As a result of the Boolean operations described by the notation within the box 286, the result is the output signal LUS-N to regulate the on-coming clutch which is applied over line 254 as indicated.

Figure 10:
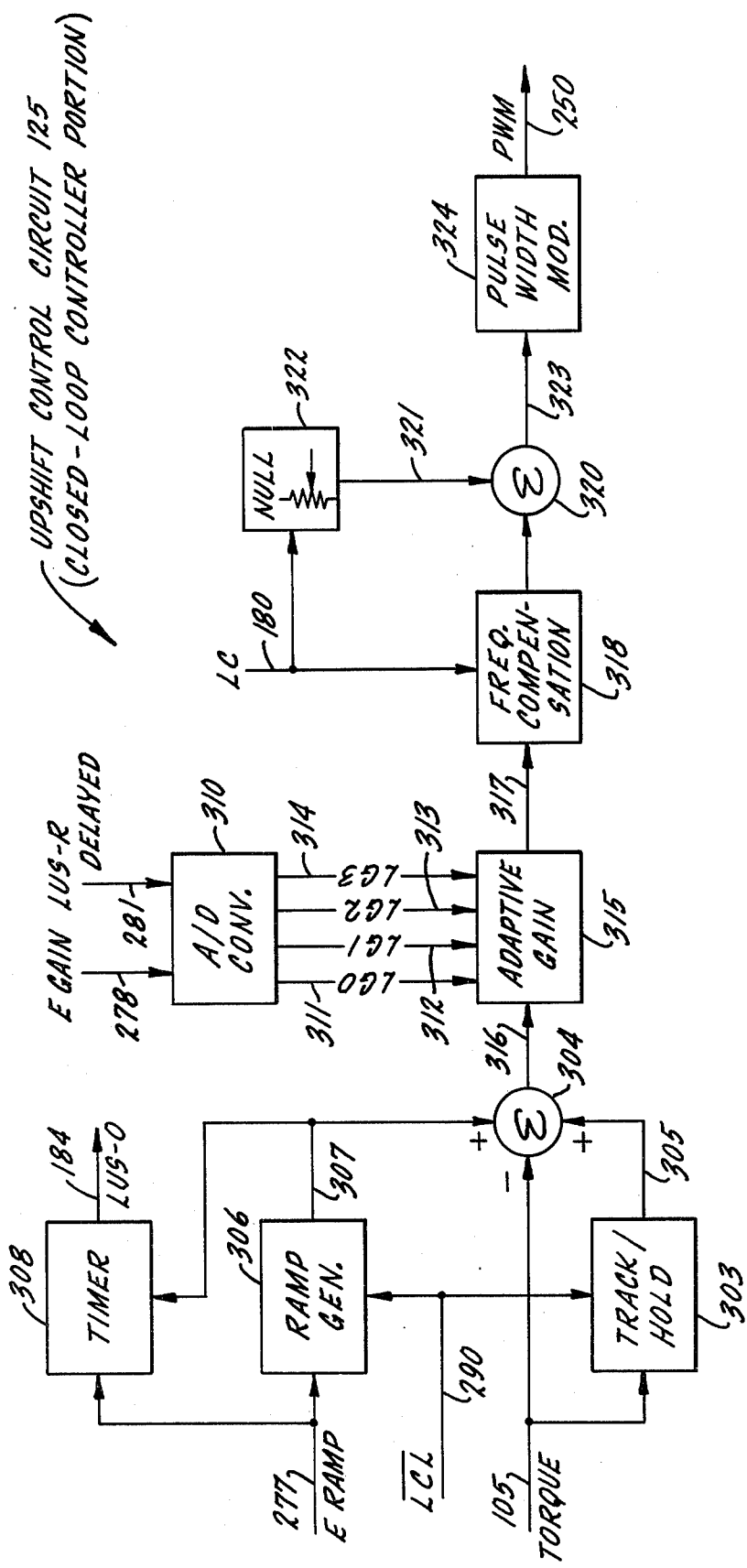
FIG. 10 is a block diagram showing additional components used in completing a closed-loop upshift.

FIG. 10 depicts the closed-loop controller portion of the upshift control circuit 125. This circuit provides the upshift-terminate signal LUS-O on line 184, at the completion of the upshift, and also provides the PWM signal on line 250 for application over the conductor to the circuits illustrated in FIG. 7. In FIG. 10 the torque signal on line 105 is applied as shown, and both the analogue voltages for the ramp and the gain controls, on lines 277 and 278, as developed by the program stage 276 in FIG. 7 are also utilized. The $\overline{\text{LCL}}$ signal developed at the Q output of flip-flop 288 is applied over line 290, the upshift signal LUS-R (delayed) is applied over line 281, and the LC status signal on line 180 is also utilized.

The torque signal applied over line 105 is passed both to a track and hold circuit 303, and to a summation stage 304. Circuit 303 continually tracks the torque level signal, which is related to the instantaneous torque at the driveline. At the time that the $\overline{\text{LCL}}$ signal is applied over line 298, the memory portion of the circuit 303 is energized to store the then-present value of the torque on the input connection. Thus after receipt of the logic signal on line 290, that stored value is "held" and presented over line 305 to one input of summation stage 304. The same logic signal on line 290 is also applied to a ramp generator circuit 306, which operates upon receipt of the analogue voltage on line 277 to initiate production of a sloping voltage waveform (or "ramp") on line 307. This upwardly-sloping waveform is utilized to regulate the increasing torque during the controlled upshift time between the times t5 and t6 as shown in FIG. 8. This ramp signal is applied to an input connection of comparator 304, and also applied to one input of a timer circuit 308, which also receives the analogue ramp-control voltage on the input line 277. In that the slope is determined by the charging time and in turn set by the components within the ramp generator 306, at the time when the level of the ramp exceeds the voltage level of the other analogue control voltage, timer 308 issues the upshift-over signal LUS-O on line 184; this occurs at time t7 in FIG. 8.

The analogue-to-digital converter circuit 310 is a conventional circuit which receives the analogue gain control voltage over line 278 and the delayed upshift-initiate signal over line 281. This converter circuit operates upon the received analogue voltage and provides a digital combination of output signals on the lines 311-314, so that this combination of four digital signals can indicate 16 different levels of the gain voltage. These digital signals are presented when the delayed upshift signal shown in FIG. 9B goes from 1 to logical 0, at time t1 in the shift sequence. The signals in turn are applied to an adaptive gain regulating circuit 315, which also receives a summed or algebraically combined signal over line 316 from the summation circuit 304. Thus it is apparent that the analogue gain control signal on line 317 at the output side of adaptive gain circuit 315 is a function of both the gain regulating voltage and the ramp adjusting voltage. Those skilled in the closed-loop control art will understand that the analogue gain voltage on line 278 is reduced upon the presence of higher torque level signals on line 105, to ensure stability of the closed-loop control system. However at lower torque levels, the gain is increased to minimize tracking errors in the system. The output signal from adaptive gain circuit 315 is always presented over line 317 to the frequency compensation network 318, which is actuated upon receipt of the LC status signal over line 180. This network can be made to operate differently during the 1-2 upshift, in that the logical signal as seen on line 180 is only a logical 0 during the 1-2 upshift and at all other times is a logical 1. The output signal from frequency compensation network 318 is passed to one input connection of another summation stage 320, which also receives a correction signal over line 321 from a null or zero-adjust unit 322. The LC logical signal on line 180 is also applied to the null circuit 322, and a portion of this signal, as determined by the setting of an adjustable component within the null circuit, as passed over line 321 to the summation stage 320. The output signal from summation stage 320 is an analogue signal on line 323, used to regulate the duty cycle of the alternating output signal on line 250 provided by pulse width modulation circuit 324.

Figure 11:
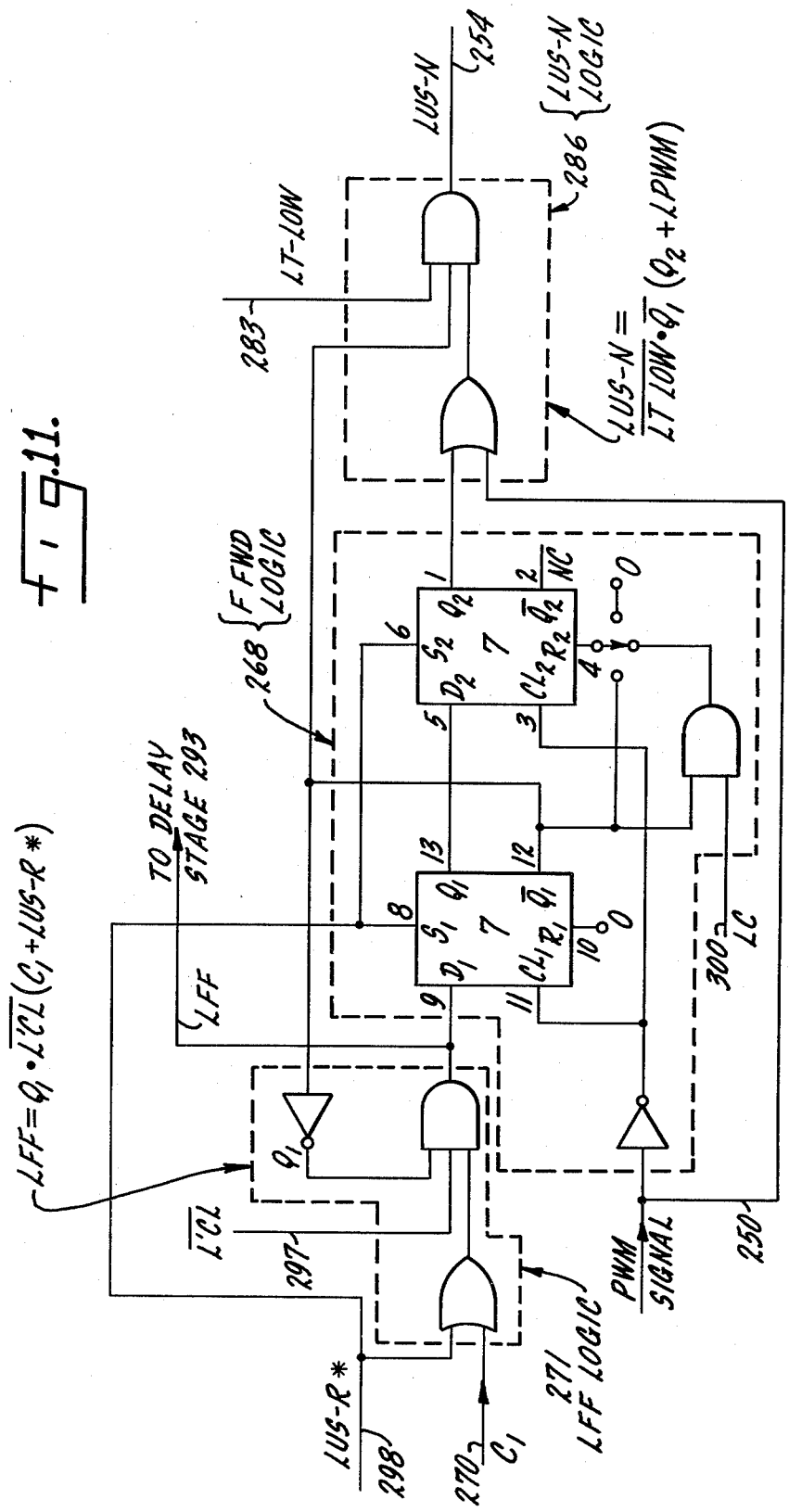
FIGS. 11 and 12 are block diagrams, with Boolean notation in FIG. 12, depicting other subsystems shown more generally in FIG. 3.

FIG. 11 depicts circuit details of the logic blocks 271, 268, and 286 shown in simplified form in FIG. 7. The Boolean expressions for the logic stages 271 and 286 are also set out. In that the expression is more complicated for the stage 268, the circuit details for the two interconnected flip-flops are shown. Accordingly, those skilled in the art will readily understand both the electrical connections, and the signal processing operations, of the arrangement shown in FIG. 11 to produce the signal LUS-N to regulate the on-coming friction element.

Figure 12:
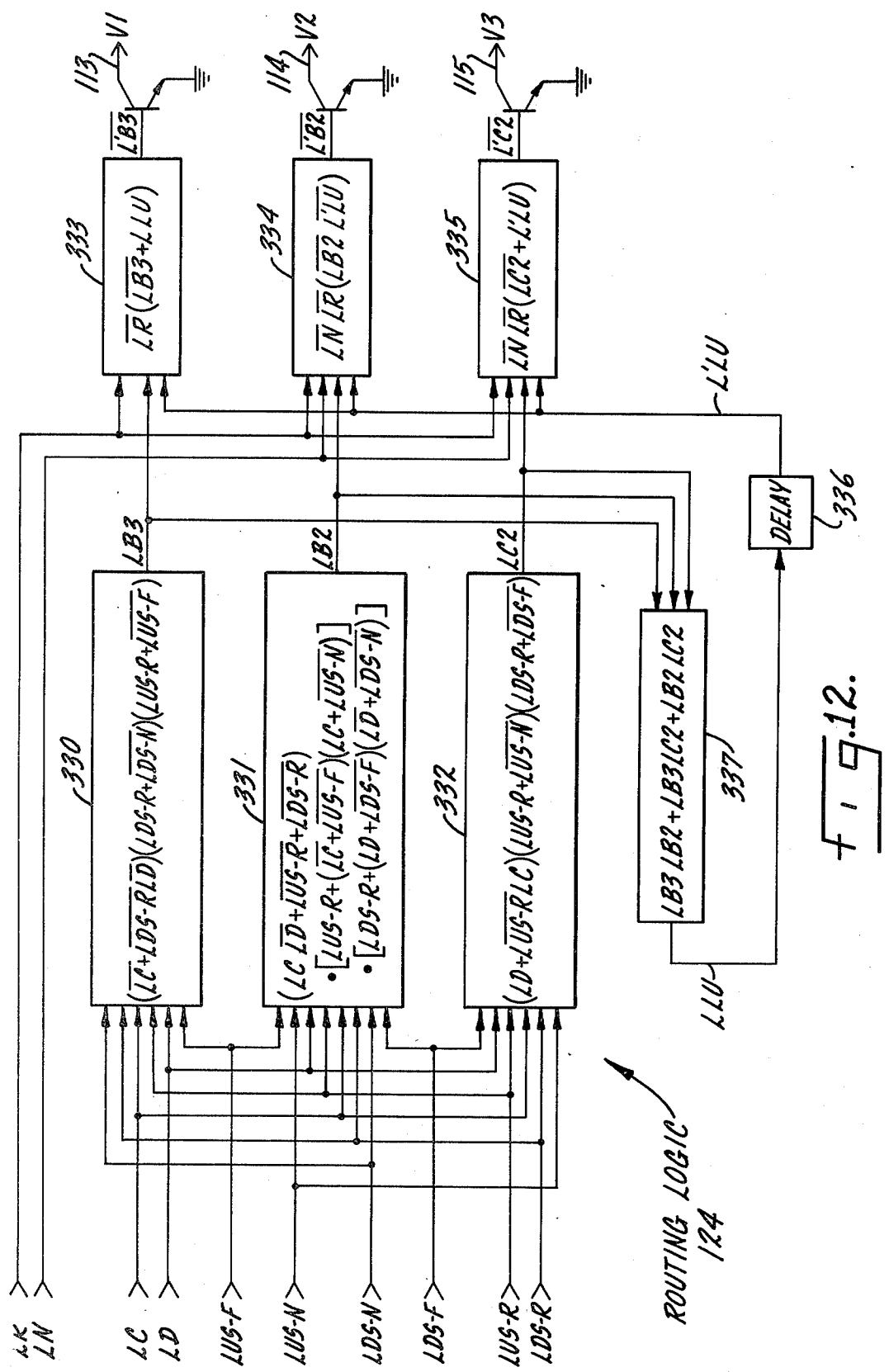

FIG. 12 depicts in Boolean form the details of the routing logic circuit 124 shown more generally in FIG. 3. The same notation is used in FIG. 12, thus identifying all the logic signals with the same characters used in FIG. 3 and in the other drawing figures. In FIG. 12 the processing stages 330, 331 and 332 receive the status signals LC, LD, the shift-initiate signal (LUS-R or LDS-R) to commence circuit operation for either an upshift or a downshift, and the appropriate pair of signals to regulate the on-coming and off-going elements, depending on whether the system is controlling an upshift or a downshift. After processing in the stages 330, 331 and 332, the output signals from these stages are passed to the additional stages 333, 334 and 335, which also receive the input reverse R and neutral N logic signals from the shift range selector. The output signals from the stages 333-335 provide signals on two of the three conductors 113, 114 and 115 to regulate the on-coming and off-going friction members.

There is a third signal input to each of the stages 333-335, from delay stage 336. This stage merely provides a time delay in the signal from processing stage 337, which in turn receives signals from each of the stages 330-332. By processing the signals as shown in stage 337, and then delaying the output of this stage in the delay stage 336 before the signal is passed to the stages 333-335, the control system is protected against lock-up of the transmission by a premature engagement of a friction element before another element has been released.

To consider the upshift sequence of operation of the system of the invention, it is assumed that the vehicle in which the automatic transmission 101 is installed has been started, that the transmission is in first gear, and that the range selector switch is in D (drive). It is further assumed that the torque demand, as indicated by the position of the wiper arm of potentiometer 111 in FIG. 2, is calling for more torque than is being produced and delivered over the driveline shaft 103 at the output side of the transmission. The shift point computer 121 (FIG. 3) is producing a digital or logical 0 as each of the output signals LA, LB, denoting that the transmission is in first gear. Before the upshift is called for, the supervisory logic circuit 123 is also producing logical 0 or low level signals as the output status signals LC, LD, and logical 1 or high level signals as the initiate signals LUS-R and LDS-R. The signal on line 113 is a logical 1 or a high signal, to valve V1, while the signals on lines 114 and 115 are low at this time. This is the status of the system just before the throttle position (or torque demand) signal on line 110 indicates that, compared to the actual torque signalled over line 105, an upshift is called for.

When the shift point computer determines that the shift is called for, the desired-gear signal LA, LB changes so that the signal on LA goes high, to a 1, while the LB signal remains low. This is received by the supervisory logic circuit 123, which in effect compares the desired ratio with the actual signal ratio indicated by LC, LD, and determines that the 1-2 shift should be initiated. This is done by providing the signal LUS-R, shown in FIG. 9A and occuring at time t0 in FIG. 8. That is, LUS-R goes low from its normally high or logical 1 position at the time t0 in FIG. 8. As shown in FIG. 7, the upshift-initiate signal is applied over line 182 to start operation of both the integrator 256, which will provide the average torque signal at the end of the period between t0 and t1, and will also start timer 257, used to determine the extent of that period. In addition, the LC signal on line 180 in FIG. 7 remains at a logical 0, "telling" the system that a 1-2 upshift is called for rather than a 2-3 upshift, which would have been signalled by a logical 1 on line 180. Thus the combination of the upshift-initiate signal on line 182 and the status signal on line 180 determine not only that an upshift will by initiated, but which upshift sequence will be followed.

At time t1, the end of the torque-averaging time is shown in FIG. 8, the output of the torque-averging timer stage 257 goes low, as shown in FIG. 9B. At this time the average-torque signal on line 258 becomes a constant, representing the average driveline torque of the vehicle just before the shift operation begins. Note that this delayed signal at time t1 is applied from the output of timer 257 as one of the input signals to processing stage 285, so that immediately there is some signal level on line 253 to regulate the off-going friction element, and the driveline torque thus begins to decrease as shown in FIG. 8.

At time t2, the driveline torque has fallen to about 0.8 times the average level just before the shift sequence began, and at this time the output signal from the first comparator 265 goes low to produce the first trigger signal shown in FIG. 9G. This output trigger signal is applied through the processing stages 271, 268 to indicate to the output processing stage 286 that the LUS-N signal should commence, so that the appropriate control valve can begin filling to respond to the 1-2 shift, which is faster than the 2-3 shift. Assuming the continuation of a normal shift, in which the torque level was above 25 foot-pounds at at the outset, the driveline torque will continue to decrease to a level approximately 0.6 times the average torque level, shown at time t3 in FIG. 8. At this time the second comparator 264 issues the second trigger signal over line 274, going low at the time t3 as shown in FIG. 9H. This trigger signal is passed through processing stage 287, flip-flop 288 and processing stage 284 to provide a signal on line 252, which is also represented in FIG. 9L, to in effect close the loop and make certain the system will operate in the closed-loop mode.

If the decrease in the torque level is too shallow to provide an output signal from the second comparator, then the loop closure will not be initiated until time t4, when a turn-around signal is generated by comparator 263 as represented in FIG. 9I. This occurs at a time when the torque signal has reached its minimum value, and then increased to approximately 20 foot-pounds above that minimum value, and then increased to approximately 20 foot-pounds above that minimum value. At time t5, when the driveline torque has again risen to approximately 0.8 of the average torque level at which the first trigger signal was generated by comparator 265, the output of this comparator again goes high, to control the ramp reset, that is, the rather short increase in the ordinate value of the ramp represented by the broken-line curve between times t3 and t5 in FIG. 8.

It is emphasized that the just-described sequence of signals from the comparators 265, 264 and 263 occurs only when the average-torque signal is above a preset reference level, which was 25 foot-pounds in the described preferred embodiment. A torque level below this indicates that closed-loop control of the shift is unnecessary, and this condition is recognized by the output signal on line 267 from low torque comparator 262. As shown in FIG. 9F, the signal level remains low and provides a signal at the output side of flip-flop 282 on line 283 which inhibits processing stage 284, and prevents the application of the output signal on line 252 to go into the closed-loop mode. Instead the signal on line 251 is passed to the open-loop upshift control arrangement 249, as shown generally in FIG. 7, so that a conventional, timed sequence of shifting is provided rather than a closed-loop, controlled arrangement.

The adaptive gain/ramp program stage 276 in FIG. 7 provides the requisite analogue signals for use in the closed-loop arrangement depicted in FIG. 10. These signals are then used to provide the pulse-width modulated signal on line 250 in FIG. 10, as described above, to regulate the torque level between times t5 and t6 as shown in FIG. 8. This allows the torque to track quite closely the desired ramp slope indicated by the broken line curve in FIG. 8. At time t6, or point 236 on the torque curve, the oncoming friction element or clutch is completely locked up, so that there is no further increase in the torque output level, and the torque generally levels out as shown in the curve between times t6 and t7. The control system of the invention remains in operation during this time interval, allowing for a margin of clearance so that it is not completely switched off until the upshift over signal LUS-O is generated by the timer 308 (FIG. 10) at the expiration of the shift sequence or at time t7.

Having considered the operation of the control system of this invention during an upshift, it remains to consider the system operation during a downshift. At the present time it has been found practical to base the control of a downshift on considerations of time, which includes three basic time periods. The first time to be considered is the acceleration time for the engine drive shaft to be accelerated to the new speed, after the load has been dropped at the initiation of the downshift. This acceleration time will be denoted ta, both in this description and in FIGS. 13 and 15. There is a certain time required for emptying the fluid from the piston which is to release the off-going member, and this time is termed te. The last time period, termed tf, is that required to fill the piston of the on-coming member. However all these times vary somewhat, depending on the speed and torque conditions at the time the downshift is initiated, the ratio in which the transmission is then operating, and the new ratio into which the transmission is to be shifted. Accordingly these different times are utilized in an initial calculation to determine in which of three modes the downshift will be regulated. These modes are termed cases 1, 2 and 3 for purposes of this discussion.

In the first case, where the initial calculation determines that the fill time tf is greater than the sum of the acceleration time ta and the empty time te, it is necessary to introduce a delay time td into the system control angorithm. When the fill time is this long, the fluid can be started into the on-coming member as soon as the shift-initiate signal is issued. However the release of the off-going member cannot be started immediately, as te is a much shorter time period; this would result in too long a time interval between the time that the off-going member is released and the power is again transmitted over the on-coming member. Hence the delay time td must be added, at the initiation of the shift, before the emptying can begin from the off-going member. Thus it is apparent that the desired delay time in the first case would be equal to the fill time ts, minus the sum of the emptying and acceleration times.

For the second case, the fill time is less than the sum of the empty and the acceleration times. To accommodate the appropriate timing under these conditions, the initiation of the fill for the on-coming member is delayed slightly by the time delay period td. This insures that there will be the proper interval between the emptying of the piston for the off-going member and the clutching on of the on-coming member. The desired time delay under case 2 is equal to the sum of the acceleration and empty times, minus the fill time for the on-coming member.

In the third case possible in the controlled downshift, the acceleration time is equal to or greater than the sum of the fill time and the empty time. Hence it is only necessary to delay the onset of the fill time by the delay time period, td. In this third case then the calculation for the delay time is equal to the acceleration time ta minus the fill time tf. The logical flow of signals to develop these operating signals to regulate the beginning of the fill and empty times is shown in FIG. 13.

As there shown, the electrical signal representing a torque is supplied over line 105 to a stage 340 which tracks the applied torque level signal until it receives the down-shift initiate signal LDS-R, and at that time stores the signal and continually presents it on output line 341. In a similar manner the speed signal on line 106 is followed by the track/store stage 342 and, upon receipt of the LDS-R signal, the instantaneous value of the speed signal at that time is stored and thereafter presented on its output conductor 343. This stored speed signal is passed to the engine inertia stage 344, and when the LD signal is received at this stage (LD is a logical one during the 3–2 downshift, and a logical zero in the 2–1 downshift), then the modified signal is applied from this stage over line 345 to the plus inputs of each of the summation stages 346 and 347.

The input torque signal on line 105 is also passed to the minus input connection of another comparator 348, which at its positive input connection receives the stored torque signal reduced by a factor determined by the setting of a potentiometer 350 or other signal-varying component. In one embodiment this potentiometer was set to pass to the comparator a signal approximately 65% of the level of the input signal received by the potentiometer. This allows comparator 348 to function as a torque drop comparator, to provide an output signal when the input torque at the negative connection has dropped to a level which is 65% that of the stored value on line 341. This torque drop signal is passed as one of three inputs to a timer stage 350. The timer also receives other input signals, such as the downshift-initiate signal LDS-R in the first and second case as described above. The stored signal on line 341 is continually passed over line 351 to the input connection of a gate 352, which is "open" or passes a signal when it receives the gating signal from the timer 350. The output of gate 352 is passed over line 353 to the plus input connection of a first comparator 354, and also to the plus input connection of another comparator 355. The torque on line 341 is also passed to a calculation stage 356, which provides an output signal, representative of the fill time required for the on-coming member, to the negative input connection of summation stage 346. Similarly the calculation stage 357 provides a signal representing the sum of the fill time and empty time for both members to the negative input connection of summation stage 347. Each of the calculation stages 356 and 357 is actuated by the LD signal which, as noted above, is a logical one only in the 3–2 downshift. The output of summation stage 346 is passed both to the comparator 354, used to produce the LT III signal, and to the inverting stage 358, used to provide the logic signal L III in the third case described above. It is noted that this signal is applied only to the timer stage 350.

The output of the other summation stage 347 is passed through an absolute value processing stage 361, and also through an inverter stage 362 to the negative input connection of comparator stage 355. The output of summation stage 347 is passed directly through buffer stage 363 to provide the L I/II logic signal. From the foregoing explanation of cases 1, 2 and 3, it is apparent how the combinations shown in FIG. 13 can be utilized to produce the logical signals there indicated. These logical signals are either a one or a zero, depending upon the conditions or the case which obtained, as shown in the first six lines of the chart in FIG. 14. It is a relatively straightforward logic combination to produce the last two lines shown in the chart, the regulating signals LDS-F and LDS-N to regulate the off-going and on-coming members, respectively. In fact processing arrangements other than that shown in FIG. 13 could also be utilized to operate upon the torque and speed signals and provide actuating signals to regulate the oncoming and off-going members for the particular downshift encountered.

Figure 15:
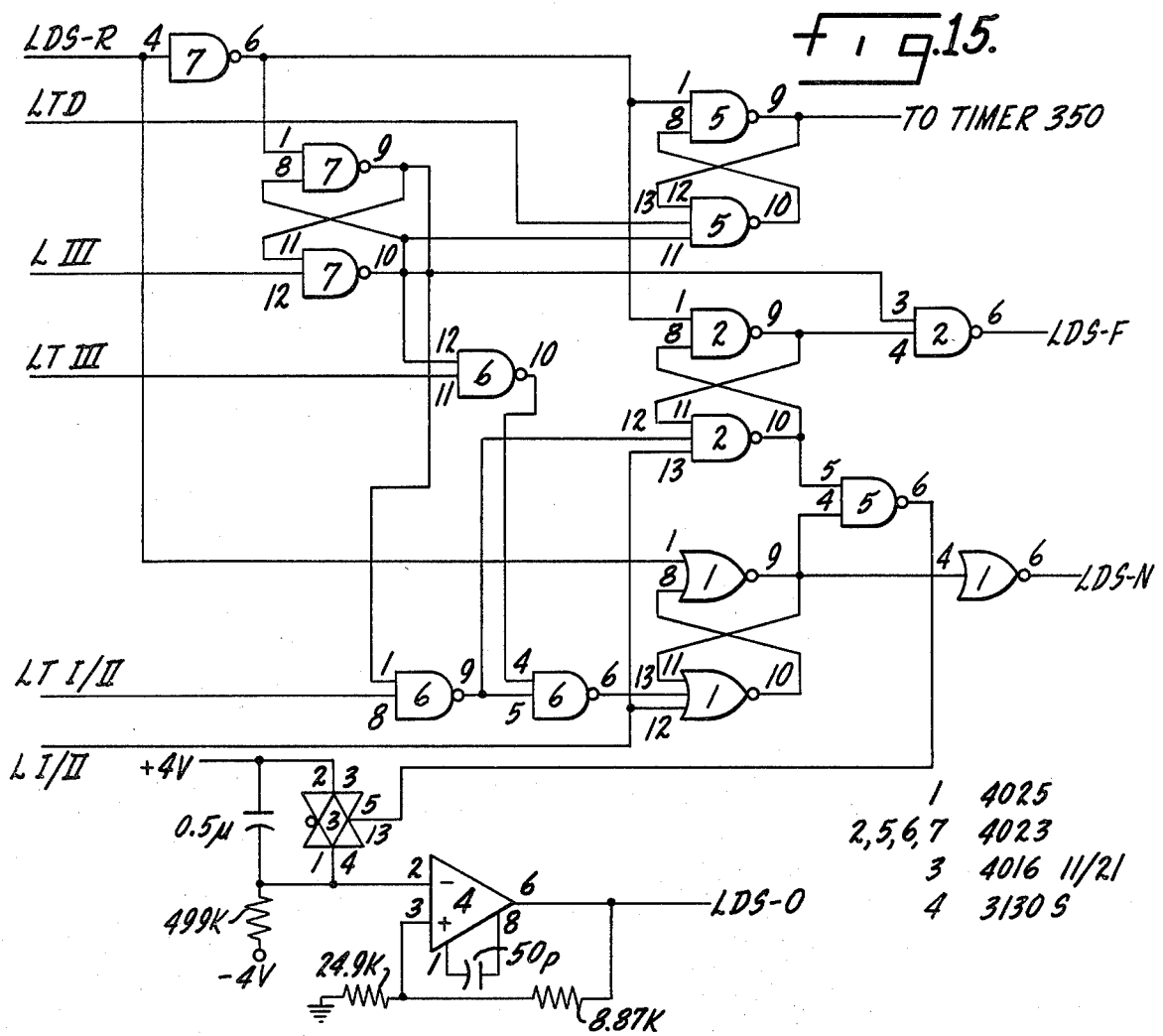
FIG. 15 is a schematic diagram illustrating one arrangement for implementing the showing of FIG. 13.

To enable those skilled in the art to make and use the invention with a minimum of experimentation, FIG. 15 depicts in schematic arrangement one circuit for implementing logic signals as shown in the first six lines of FIG. 14 to provide the on-coming and off-going signals to the respective friction members. This circuit is particularly applicable to the description given above for case three, when the total acceleration time is greater than, or equal to, the sum of the fill time and the empty time. In that the circuit values are shown for the various logic and flip-flop circuits, those skilled in the art will readily implement the arrangement from the foregoing explanation.

TECHNICAL ADVANTAGES

The invention provides a substantial advantage over other control systems for multi-ratio transmissions. In a 3-speed or a 4-speed automatic transmission, all the upshifts (1-2, 2-3 and 3-4) are controlled by the same upshift control circuit. Similarly, all the downshifts are regulated by a single downshift control circuit. The system automatically attains the correct ratio because of the continual comparison to determine when an upshift or downshift is needed. By employing only one upshift control circuit and one downshift control circuit, a well regulated, precise control of each upshift and downshift is achieved without redundant or unnecessarily complex circuitry.

As used in the appended claims, the term "connected" means a d-c connection between two components with virtually zero d-c resistance between those components. The term "coupled" indicates there is a functional relationship between two components, with the possible interposition of other elements between the two components described as "coupled" or "intercoupled".

While only a particular embodiment of the invention has been described and claimed herein, it is apparent that various modifications and alterations of the invention may be made. It is, therefore, the intention in the appended claims to cover all such modifications and alterations as may fall within the true spirit and scope of the invention.

What is claimed is:

1. A control system for regulating gear ratio changes in a multi-ratio automatic transmission coupled between an engine and an output mechanical drive connection, which transmission has at least 3 forward speeds, comprising:

gear ratio command means operative to provide a ratio-change command signal upon receiving information input signals including range selector information;

a supervisory logic circuit, connected to receive the ratio-change command signal and to receive range selector information, and to provide a shift-initiate signal when a gear ratio change is indicated;

a routing logic circuit, connected to receive said shift-initiate signal from the supervisory logic circuit, range selector information, and shift quality control signals, operative to provide selective output signals which respectively regulate selected means for placing the automatic transmission in the desired gear ratio, and only one upshift control circuit, connected to regulate the 1-2 and 2-3 upshifts, and only one downshift control circuit connected to regulate the 3-2 and 2-1 downshifts, each connected to provide said shift quality control signals to the routing logic circuit upon receipt of the appropriate shift-initiate signal from the supervisory logic circuit.

2. A control system as claimed in claim 1, and further characterized in that the gear ratio command means includes a shift point computer, connected to receive a first input signal which varies as a function of torque demand, a second input signal including said range selector information, and a third input signal, which varies as a function of the speed of the output mechanical drive connection, which shift point computer is operative to provide the ratio-change command signal.

3. A control system as claimed in claim 1, and further characterized in that the gear ratio command means includes a manual gear selection arrangement for receiving a first input signal indicating a desired gear ratio, and a second input signal including said range selector information.

4. A control system as claimed in claim 1, and further characterized by the upshift control circuit being connected to provide a shift-completed signal to the supervisory logic circuit upon termination of an upshift gear ratio change sequence.

5. A control system as claimed in claim 1 and further characterized by the downshift control circuit being connected to provide a shift-completed signal to the supervisory logic circuit upon termination of a downshift gear ratio change sequence.

6. A control system for regulating gear ratio changes in a multi-ratio automatic transmission coupled between an engine and an output mechanical drive connection, which transmission has at least 3 forward speeds, comprising:

gear ratio command means operative to provide a ratio-change command signal upon receiving information input signals including range selector information;

a supervisory logic circuit, connected to receive the ratio-change command signal and to receive range selector information;

a routing logic circuit, connected to receive a shift-initiate signal from the supervisory logic circuit, range selector information, a status signal denoting the actual gear ratio, and shift quality control signals, operative to provide selective output signals which respectively regulate selected means for placing the automatic transmission in the desired gear ratio;

a single upshift control circuit, connected to regulate both the 1-2 and 2-3 upshifts, to receive the shift-initiate and status signals from the supervisory logic circuit, to provide said shift quality control signals to the routing logic circuit, and to provide a shift-completed signal to the supervisory logic circuit upon termination of an upshift gear ratio change sequence; and a single downshift control circuit, connected to regulate both the 3-2 and 2-1 downshifts, to receive the shift-initiate and status signals from the supervisory logic circuit, to provide said shift quality control signals to the routing logic circuit, and to provide a shift-completed signal to the supervisory logic circuit upon termination of a downshift gear ratio change sequence.

7. A control system as claimed in claim 6, and further characterized in that the gear ratio command means includes a shift point computer, connected to receive a first input signal which varies as a function of torque demand, a second input signal including said range selector information, and a third input signal, which varies as a function of the speed of the output mechanical drive connection, which shift point computer is operative to provide the ratio-change command signal.

8. A control system as claimed in claim 6, and further characterized in that the gear ratio command means includes a manual gear selection arrangement for receiving a first input signal indicating a desired gear ratio, and a second input signal including said range selector information.

9. A control system for regulating gear ratio changes in a multi-ratio automatic transmission coupled between an engine and an output mechanical drive connection, which transmission has at least 3 forward speeds, comprising:

a shift point computer, connected to receive a first input signal which varies as a function of torque demand, a second input signal including range selector information, and a third input signal, which varies as a function of the speed of the output mechanical drive connection, which shift point computer is operative to provide a ratio-change command signal;

a supervisory logic circuit, connected to receive the ratio-change command signal and to receive range selector information;

a routing logic circuit, connected to receive a shift-initiate signal from the supervisory logic circuit, range selector information, a status signal denoting the actual gear ratio, and shift quality control signals, operative to provide selective output signals which respectively regulate selected means for placing the automatic transmission in the desired gear ratio;

a single upshift control circuit, connected to receive the shift-initiate and status signals from the supervisory logic circuit, to provide said shift quality control signals to the routing logic circuit, and to provide a shift-completed signal to the supervisory logic circuit upon termination of an upshift gear ratio change sequence to thus control both the 1-2 and 2-3 upshifts; and a single downshift control circuit, connected to receive the shift-initiate and status signals from the supervisory logic circuit, to provide said shift quality control signals to the routing logic circuit, and to provide a shift-completed signal to the supervisory logic circuit upon termination of a downshift gear ratio change sequence to thus control both the 3-2 and 2-1 downshifts.

10. A control system for a multi-ratio automatic transmission having an output shaft, comprising:

a shift point computer, connected to receive input information including torque demand and at least one indication of an automatic transmission output parameter, and to provide an output signal denoting the desired gear ratio of the transmission;

a supervisory control circuit connected to receive the output signal from the shift point computer, to continually compare that output signal with a status signal denoting the actual gear ratio, to both interrupt the comparison of signals and initiate a gear ratio change when the status signal differs from the desired-gear-ratio signal produced by the shift point computer, and to provide controlling signals to the automatic transmission to effect the desired change of gear ratio; and a shift quality control circuit, coupled to the supervisory control circuit, for providing signals to the supervisory control circuit to effect precise control of the gear ratio change, and for signalling termination of the gear ratio change to allow the supervisory control circuit to resume comparison of the desired-gear-ratio signal with the actual gear ratio signal.

11. A control system as claimed in claim 10, including a transducer, positioned adjacent the output shaft of the automatic transmission, for providing the indication of the transmission output parameter to the shift quality control circuit and to the shift point computer.

12. A control arrangement for controlling the changes of gear ratio in a multi-range automatic transmission having at least 3 forward speeds, which receives drive from an engine and has an output drive connection for supplying drive torque to a load, comprising:

a shift point computer connected to receive input information, including torque demand, and to provide a desired-gear-ratio signal;

sensor means, operatively associated with the output drive connection, for developing an output signal which varies as a function of the drive at the output connection; and a control system, coupled to the shift point computer and the sensor means, including only one upshift control circuit for regulating both the 1-2 and the 2-3 upshifts and only one downshift control circuit for regulating both the 3-2 and the 2-1 downshifts, for continually monitoring the desired-gear-ratio signal to detect any difference from the actual gear ratio, initiating a gear ratio change when such difference is detected and interrupting the monitoring function during the change, and resuming the monitoring function upon completion of the gear ratio change.

13. A control arrangement as claimed in claim 12, in which the output signal developed by the sensor means varies as a function of drive torque.

14. The method of controlling gear ratio changes of a multi-ratio automatic transmission having at least 3 forward speeds and which provides output torque over an output drive shaft, comprising the steps of:

providing a first signal related to the torque demand on the transmission, and providing a second signal related to at least one parameter of the automatic transmission output;

operating upon the first and second signals to produce a signal denoting the desired gear ratio of the transmission;

comparing the desired gear ratio signal with a signal connoting the actual gear ratio;

upon recognizing a difference between the desired gear ratio signal and the actual gear ratio signal, interrupting the comparison between the desired and actual ratio signals, assigning a first shift quality control component to regulate any of the upshifts when a 1-2 or a 2-3 upshift is called for and assigning a second shift quality control component when a 3-2 or a 2-1 downshift is called for, and controlling the particular gear ratio change with the assigned component and utilizing a signal representing the drive-line torque; and upon completing the controlled gear ratio change, releasing the assigned shift quality control component and resuming the comparison of the desired gear ratio signal and the actual gear ratio signal.

15. The method of controlling gear ratio changes as claimed in claim 14, and comprising the additional steps of determining whether the output torque signal exceeds a predetermined level, initiating a closed-loop controlled ratio change when the torque signal exceeds the predetermined level, and initiating an open-loop sequence of ratio change when the torque signal is less than said predetermined level.

16. The method of regulating a gear ratio change in a multi-ratio automatic transmission having at least 3 forward speeds and coupled to an engine in an automobile, comprising the steps of:

developing a desired-ratio signal by utilizing input information, including range selector information and torque demand information;

comparing the desired-ratio signal with an actual ratio status signal, and providing a shift-initiate signal when the actual ratio differs from the desired ratio;

assigning only one upshift control circuit to complete a path for providing shift control signals to regulate both a 1-2 and 2-3 gear ratio change, and assigning only one downshift control circuit to complete a path for providing shift control signals so regulate both a 3-2 and a 2-1 gear ratio change; and utilizing said shift-initiate signal, said status signal, and the shift control signals received over the assigned path to effect a gear ratio change in the automatic transmission.

17. The method of regulating a gear ratio change including the steps defined in claim 16, in which the input information further includes engine control information.

18. The method of regulating a gear ratio change including the steps defined in claim 16, in which the input information further includes signals transmitted manually by the automobile driver.

19. The method of regulating a gear ratio change in an automatic transmission having at least 3 forward speeds and coupled to an engine in an automobile, comprising the steps of:

developing a ratio-change command signal by utilizing input information, including range selector information, torque demand information, and transmission output shaft speed information;

operating upon the ratio change command signal, in conjunction with additional range selector information, to provide a shift-initiate signal and a gear ratio status signal;

assigning only one upshift control circuit to complete a routing path for providing shift control signals to regulate a desired gear ratio change whenever any upshift is called for, and assigning only one downshift control circuit to complete a routing path for providing shift control signals to regulate a desired gear ratio change whenever any downshift is called for; and utilizing said shift-initiate signal, said status signal, and the shift control signals received over the assigned routing path to effect the desired gear ratio change in the automatic transmission.

20. The method of regulating a gear-ratio change including the steps defined in claim 19, and further including the steps of generating a shift-completed signal in the assigned routing path at the end of the gear ratio change sequence, and utilizing the shift-completed signal to reset the gear ratio status signal.

* * * * *